(12) United States Patent
Rodriguez et al.

(10) Patent No.: US 7,414,625 B1
(45) Date of Patent: Aug. 19, 2008

(54) GENERATION OF GLOW EFFECT

(75) Inventors: Owens Rodriguez, Austin, TX (US); Sean E. Dunn, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/565,512

(22) Filed: Nov. 30, 2006

Related U.S. Application Data

(63) Continuation of application No. 10/355,529, filed on Jan. 31, 2003, now Pat. No. 7,202,867.

(51) Int. Cl.
*G06T 15/60* (2006.01)

(52) U.S. Cl. .................. 345/426; 345/419; 345/583; 345/589; 345/597; 345/629

(58) Field of Classification Search ............... 345/426, 345/629, 583, 597, 419, 581, 589
See application file for complete search history.

(56) References Cited

U.S. PATENT DOCUMENTS

| | | | |
|---|---|---|---|
| 3,736,564 A | 5/1973 | Watkins | |
| 5,268,988 A | 12/1993 | Miyamoto et al. | |
| 5,446,833 A | 8/1995 | Miller et al. | |
| 5,488,700 A | 1/1996 | Glassner | |
| 5,561,746 A | 10/1996 | Murata et al. | |
| 5,706,417 A | 1/1998 | Adelson | |
| 5,844,566 A | 12/1998 | Lecland et al. | |
| 5,923,331 A | 7/1999 | Dusseux et al. | |
| 5,936,628 A | 8/1999 | Kitamura et al. | |
| 5,995,111 A | 11/1999 | Morioka et al. | |
| 6,226,006 B1 | 5/2001 | Collodi | |
| 6,271,861 B1 | 8/2001 | Sargent et al. | |
| 6,289,133 B1 | 9/2001 | Oshino | |
| 6,426,755 B1 | 7/2002 | Deering | |
| 6,468,160 B2 | 10/2002 | Eliott | |
| 6,489,955 B1 | 12/2002 | Newhall | |
| 6,525,740 B1 | 2/2003 | Cosman | |
| 6,537,153 B2 | 3/2003 | Boku et al. | |
| 6,552,726 B2 | 4/2003 | Hurley et al. | |
| 6,563,499 B1 | 5/2003 | Waupotitsch et al. | |
| 6,614,431 B1 | 9/2003 | Collodi | |
| 6,618,054 B2 | 9/2003 | Deering | |
| 6,712,704 B2 | 3/2004 | Eliott | |
| 6,769,989 B2 | 8/2004 | Smith et al. | |
| 6,811,489 B1 | 11/2004 | Shimizu et al. | |
| 6,900,799 B2 | 5/2005 | Takeuchi | |
| 6,903,741 B2 | 6/2005 | Corbetta | |
| 6,917,718 B2 | 7/2005 | Ichimura | |

(Continued)

OTHER PUBLICATIONS

Bikker, "Bilinear Filtering (Interpolation)," Flipcode, Daily Game Development News and Resources, Jan. 13, 1999, accessed on May 18, 2006, 3 pages.

(Continued)

*Primary Examiner*—Kimbinh T Nguyen
(74) *Attorney, Agent, or Firm*—Lee & Hayes, PLLC

(57) ABSTRACT

A technique generates a glow effect in an image. The technique selects an area within a scene that is to glow to produce a selected area image, generates glow using the selected area image to produce a glowing area image, and then adds the glowing area image to the scene to provide the glow effect.

17 Claims, 19 Drawing Sheets

U.S. PATENT DOCUMENTS

| | | |
|---|---|---|
| 6,925,210 B2 | 8/2005 | Herf |
| 6,956,576 B1 | 10/2005 | Deering et al. |
| 6,975,324 B1 | 12/2005 | Valmiki et al. |
| 6,985,148 B2 | 1/2006 | Liang et al. |
| 7,043,695 B2 | 5/2006 | Elber et al. |
| 7,068,275 B2 | 6/2006 | Nakamura et al. |
| 7,102,647 B2 | 9/2006 | Sloan et al. |
| 7,110,602 B2 | 9/2006 | Krause |
| 2001/0017935 A1 | 8/2001 | Suzaki et al. |
| 2001/0045956 A1 | 11/2001 | Hurley et al. |
| 2001/0048444 A1 | 12/2001 | Hurley et al. |
| 2003/0002730 A1 | 1/2003 | Petrich |
| 2003/0189568 A1 | 10/2003 | Alkouh |
| 2003/0234789 A1 | 12/2003 | Gritz |
| 2004/0086184 A1 | 5/2004 | Kondo et al. |
| 2004/0100465 A1 | 5/2004 | Stowe et al. |
| 2004/0113911 A1 | 6/2004 | Collodi |
| 2004/0162137 A1 | 8/2004 | Eliott |
| 2004/0197022 A1 | 10/2004 | Gonsalves |
| 2004/0199531 A1 | 10/2004 | Kim et al. |
| 2004/0228529 A1 | 11/2004 | Jerbko et al. |

OTHER PUBLICATIONS

Blinn, et al., "Texture and Reflection in Computer Generated Images," Communications of the ACM, vol. 19, No. 10, Oct. 1976, pp. 542-547.

Brabec, et al., "Shadow Volumes on Programmable Graphics Hardware," Eurographics 2003, vol. 22, No. 3, 2003, 8 pages.

Chang, et al., "Image Shading Taking into Account Relativistic Effects," ACM Transactions on Graphics, vol. 15, No. 4, Oct. 1996, pp. 265-300.

Definition of Polar Coordinated, available at <<http://en.wikipedia.org/wiki/Polar_coordinat#Polar_coordinates>>, accessed on Nov. 4, 2005, 7 pages.

Dietrich, presentation entitled "Shadow Techniques," available at <<http://developer.nvidia.com/view.asp?IO=gdc2001_show_techniques>>, 2001, 57 pages.

Engel, "Direct3D Shader X: Vertex and Pixel Shader Tips and Tricks," 2002, Wordware Publishing, Inc., pp. 72-124.

Everitt, "Projective Texture Mapping," available at <<http://developer.nvidia.com/view.asp?IO=Projective_Texture_Mapping>>, 2001, 7 pages.

Wikipedia Online Encyclopedia, "Golden Eye 007," available at, <<http://en.wikipedia.org/wiki/GoldenEye_007>>, accessed on Dec. 12, 2005, 11 pages.

Goral, et al., "Modeling the Interaction of Light Between Diffuse Surfaces," Computer Graphics SIGGRAPH 84, vol. 18, No. 3, Jul. 1984, pp. 213-222.

Screen shot from "Halo: Combat Evolved," accessible at <<http://flea.samware.net/Halo%20Zoom.JPG>>, accessed on May 15, 2006, 1 page.

Screen shot from "Halo: Combat Evolved," available at <<http://telefragged.com/indes.php3?file=reviews/halo-pc/shots>>>>, accessed on May 15, 2006, 2 pages.

Max, "Atmospheric Illumination and Shadows," ACM SIGGRAPH Computer Graphics, vol. 20, Issue 4, Aug. 1986, pp. 117-124.

Rose, "SAMS Teach Yourself Adobe Photoshop 5.5 in 24 hours," Oct. 1999, Sams Publishing, p. 329.

Screen shot from "Halo: Combat Evolved," accessed May 18, 2006, 1 page.

"Shadow Volume," Wikipedia online encyclopedia article, available at <<http://en.wikipedia.org/wiki/Shadow_Volumes>>, accessed on Aug. 3, 2005, 2 pages.

"Shadow Volumes," available at <<http://www.cc.gatech.edu/classes/AY2004/cs4451a_fall/sv.pdf>>, accessed on Aug. 3, 2004, 7 pages.

"Shadow Volumes," available at <<http://www.caip.rutgers.edu/~kuttuva/shadow_volumes.html>>, accessed on Aug. 3, 2005, 4 pages.

Stanley, "The Complete Idiots Guide to Adobe Photoshop 5," 1999, Macmillan Computer Publishing, pp. 89-93.

Turkowski, "Anti-Aliasing through the Use of Coordinate Transformations," ACM Transactions on Graphics, vol. 1, No. 3, Jul. 1982, pp. 215-233.

Poynton, definition of "luminance" provided in Digital Video and HDTV Algorithms and Interfaces, Morgan Kaufmann Publishers, 2003, p. 636.

"Halo: Combat Evolved," Microsoft Corporation, 2001, 16 pages.

Salvator, "ExtremeTech 3D Pipeline Tutorial," at <<http://www.extremetech.com/print_article2/0,1217,a=2674,00.asp>>, Jun. 13, 2001, 39 pages.

US 7,414,625 B1

GENERATION OF GLOW EFFECT

CROSS REFERENCE TO RELATED APPLICATIONS

This application is a continuation of U.S. Ser. No. 10/355,529, filed on Jan. 31, 2003, entitled "Generation of Glow Effect," and naming Owens Rodiguez and Sean E. Dunn as inventors. This application is incorporated herein by reference in its entirety.

TECHNICAL FIELD

This invention relates to the generation of a special effect in an image, and more particularly, to the generation of a glow-type effect in an image.

BACKGROUND

Designers of computer graphics applications continually strive to improve the realism of rendered scenes. For instance, computer game applications typically demand realism to increase the player's interest in the game, and hence, to enhance the marketability of the game. For example, game designers have been challenged to provide ever-increasing realism in such special effects as fire, explosions, smoke, fog, rain, lens flares, waves, etc. A first challenge is to devise a technique for simulating a special effect in the graphical realm. A second challenge is to implement this technique within the sometimes significant constraints of the hardware and processing limitations of a particular game-playing platform.

One special effect that can contribute to the realism of rendered scenes is a glow-type effect, where one or more objects in the scene are rendered in such a manner as to appear to glow. The glow of an actual physical object is a relatively complicated phenomenon, thus making the realistic simulation of this phenomenon a challenging task. Again, the challenge is exacerbated when this effect must be accomplished in a resource-efficient manner within the limitations of a specific game-playing platform.

Accordingly, there is an exemplary need in the art for an efficient technique for generating graphical effects, such as glow-type effects.

SUMMARY

A technique is described herein for generating a glow effect in an image which addresses the above-described need. The technique includes the steps of: (a) selecting an area within a scene that is to glow to produce a selected area image; (b) generating glow using the selected area image to produce a glowing area image; and (c) adding the glowing area image to the scene to provide the glow effect.

Step (a) can include rendering the scene to provide a rendered scene image, creating a mask that defines the area which is to glow, and applying the mask to the rendered scene image to produce the selected area image. The mask is created by generating stencil values within a stencil buffer that define the area which is to glow. This step, in turn, may include setting the stencil values to an initial value (e.g., the value 255) before the scene is rendered, and then modifying the initial values in the course of the rendering to provide the stencil values that define the area which is to glow. The mask is applied by calculating luminance values respectively associated with the scene elements within the rendered scene image, performing a masking test by comparing the stencil values in the stencil buffer with corresponding calculated luminance values associated with respective scene elements in the rendered scene image, outputting a masking color value (e.g., black) for scene elements in the rendered scene image that fail the masking test, and outputting a non-masking color value for scene elements in the rendered scene image that pass the masking test.

Step (b) can include generating multiple versions of the selected area image, and forming a weighted sum of the multiple versions to provide the glowing area image. The multiple versions are offset from a reference center point in different respective directions. This step provides a blurring effect in the selected area image.

Step (c) can include adding color values within the glowing area image to corresponding color values within the rendered scene image. In this step, the masked regions of the glowing area image that are colored black do not contribute to the final output color values.

BRIEF DESCRIPTION OF THE DRAWINGS

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

To facilitate explanation, this disclosure describes the generation of the glow effect in the exemplary context of a gaming system. However, the techniques described herein can be applied in any image processing context, such as simulation environments, computer-aided design and manufacturing environments, medical imaging environments, computer-aided navigation of resources, etc.

The term "glow" represents any kind of phenomenon in which an object emits light or appears to emit light. In a game playing context, for instance, an application may render a glowing object to indicate that the object possesses some special feature at a particular point in the game (such as a magical attribute). Alternatively, or an addition, an application may render a glowing object to simulate the appearance of that object in the physical realm. Hot metals, lava, the sun, and various types of artificial lights name just a few of the various graphical objects that the glow effect can be applied to. Of course, the possibilities here are vast. Generally, the term "object" can refer to any information that appears in the scene of any size, shape, and spatial distribution.

The disclosure includes: Section A describing an exemplary gaming system for use in generating the glow effect (referencing FIGS. 1 and 2); Section B describing an exemplary three dimensional processing pipeline (referencing FIGS. 3-10); and Section C specifically describing exemplary logic and steps used to generate the glow effect (referencing FIGS. 11-19).

A. EXEMPLARY GAMING SYSTEM

Figure 1:
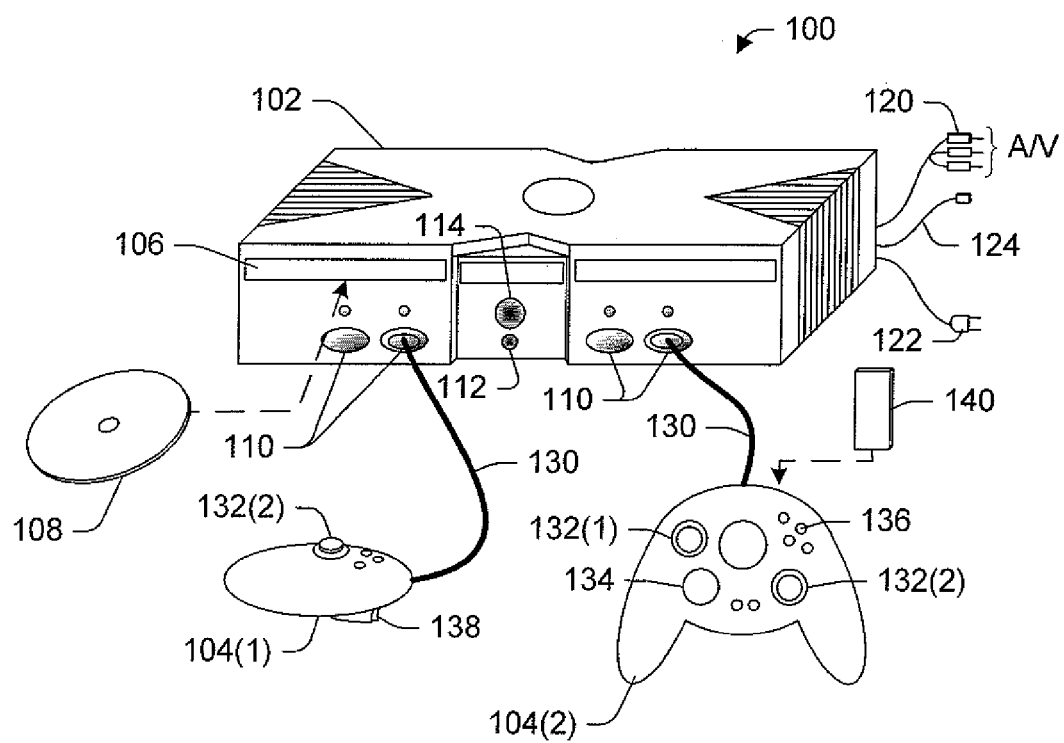
FIG. 1 shows an exemplary gaming system with a game console and one or more controllers for implementing the generation of the glow effect.

FIG. 1 shows an exemplary gaming system 100. It includes a game console 102 and up to four controllers, as represented by controllers 104(1) and 104(2). The game console 102 is equipped with an internal hard disk drive and a portable media drive 106. The portable media drive 106 supports various forms of portable storage media as represented by optical storage disc 108. Examples of suitable portable storage media include DVD, CD-ROM, game discs, game cartridges, and so forth.

The game console 102 has four slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

The game console 102 connects to a television or other display (not shown) via A/V interfacing cables 120. A power cable 122 provides power to the game console. The game console 102 may further be equipped with internal or externally added network capabilities, as represented by the cable or modem connector 124 to facilitate access to a network, such as a local area network (LAN) or the Internet.

Each controller 104 is coupled to the game console 102 via a wire or wireless interface. In the illustrated implementation, the controllers are USB (Universal Serial Bus) compatible and are connected to the console 102 via serial cables 130. The controller 102 may be equipped with any of a wide variety of user interaction mechanisms. As illustrated in FIG. 1, each controller 104 is equipped with two thumbsticks 132(1) and 132(2), a directional or D-pad 134, surface buttons 136, and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and transport them for play on other consoles. In the described implementation, each controller is configured to accommodate two memory units 140, although more or less than two units may be employed in other implementations.

The gaming system 100 is capable of playing, for example, games, music, and videos. With the different storage offerings, titles can be played from the hard disk drive or the portable medium 108 in drive 106, from an online source, or from a memory unit 140. A sample of what the gaming system 100 is capable of playing back includes:

1. Game titles played from CD and DVD discs, from the hard disk drive, or from an online source.
2. Digital music played from a CD in the portable media drive 106, from a compressed file on the hard disk drive (e.g., Windows Media Audio (WMA) format), or from online streaming sources.
3. Digital audio/video played from a DVD disc in the portable media drive 106, from a file on the hard disk drive (e.g., Windows Media Video (WMV) format), or from online streaming sources.

Figure 2:
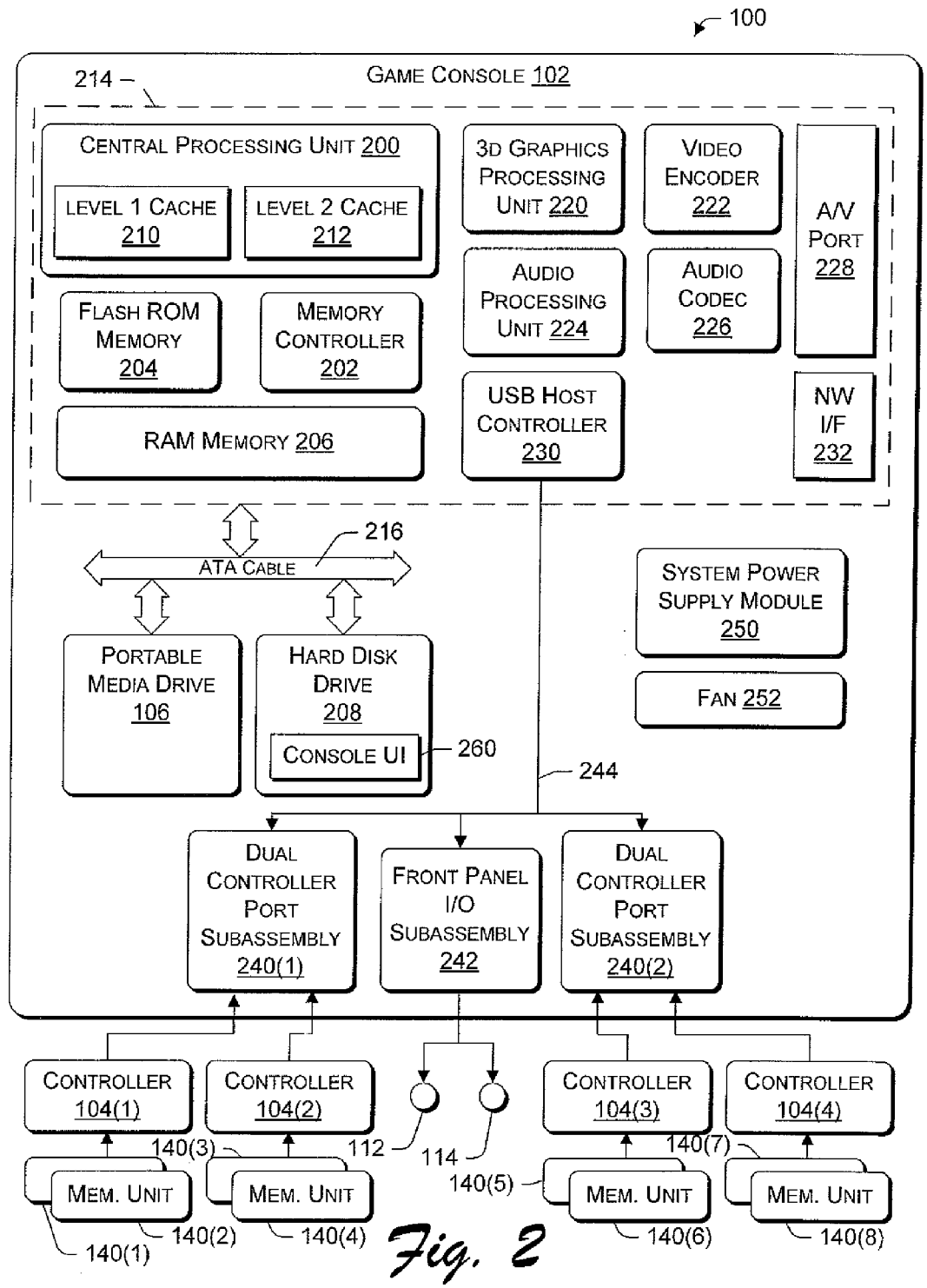
FIG. 2 shows a block diagram of the gaming system shown in FIG. 1.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

As one suitable implementation, the CPU 200, memory controller 202, ROM 204, and RAM 206 are integrated onto a common module 214. In this implementation, ROM 204 is configured as a flash ROM that is connected to the memory controller 202 via a PCI (Peripheral Component Interconnect) bus and a ROM bus (neither of which are shown). RAM 206 is configured as multiple DDR SDRAM (Double Data Rate Synchronous Dynamic RAM) modules that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., LAN, Internet, etc.) and may be any of a wide variety of various wired or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

A console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The game console 102 implements a cryptography engine to perform common cryptographic functions, such as encryption, decryption, authentication, digital signing, hashing, and the like. The cryptography engine may be implemented as part of the CPU 200, or in software stored in memory (e.g., ROM 204, hard disk drive 208) that executes on the CPU, so that the CPU is configured to perform the cryptographic functions.

The gaming system 100 may be operated as a standalone system by simply connecting the system to a television or other display. In this standalone mode, the gaming system 100 allows one or more players to play games, watch movies, or listen to music. However, with the integration of network connectivity made available through the network interface 232, the gaming system 100 may further be operated as a participant in a larger network gaming community.

Video games may be stored on various storage media for play on the game console. For instance, a video game may be stored on the portable storage disc 108, which is read by drive 106. Alternatively, the video game may be stored in hard disk drive 208, being transferred from a portable storage medium or downloaded from a network. During play, portions of the game are temporarily loaded into RAM memory 206, caches 210 and 212, and executed by the CPU 200. One particular video game of the shooter genre is described in the following sections.

The above game-playing environment is exemplary. The generation of the glow effect can be implemented using other types of computing devices than the console-based module discussed above. For instance, the generation of the glow effect can also be implemented on an arcade-type game machine, a personal computer, or other kind of general or special purpose computing device. Moreover, the glow effect can be applied to other image processing environments besides the game-playing environment; the game-playing environment is merely illustrative of one exemplary application.

B. THREE DIMENSIONAL PROCESSING PIPELINE

The following section discusses an exemplary three dimensional (3D) graphics tool environment for implementing the generation of the glow effect. Generally, a 3D graphics tool converts input data into a rendered 3D scene. The conversion takes place in a series of stages. The stages form a 3D processing pipeline. In one implementation, the Microsoft® DirectX® 8.(n) rendering tool produced by Microsoft Corporation of Redmond, Wash. can be used to provide the 3D processing environment. However, the generation of the glow effect can be implemented using other rendering tools. Machine-readable code for implementing the processing pipeline can be stored within any memory module, or any combination of memory modules, identified above in the context of FIG. 2. Parts of the pipeline's functionality can also be implemented in function-specific processing modules, such as the 3D graphics processing unit 220.

Figure 3:
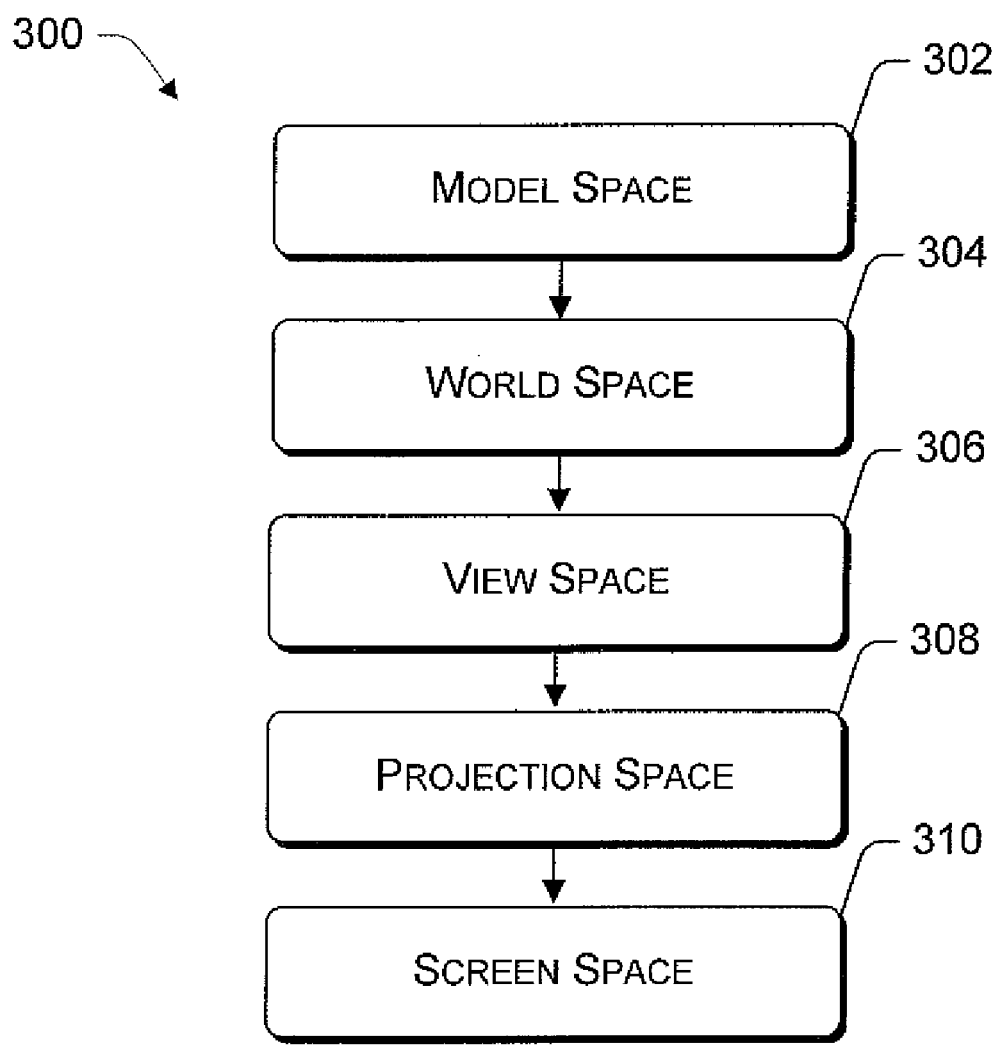
FIG. 3 shows a geometry pipeline used to produce a three dimensional scene.

To begin with, FIG. 3 shows a geometry pipeline 300 for transforming the input data to a final rendered scene. The geometry pipeline 300 includes a plurality of spaces. A "space" refers to a coordinate system scheme for positioning objects within a frame of reference. Generally, Microsoft® DirectX® 8.(n) uses left-handed coordinate systems. In a left-handed system, the Z-axis (depth-related axis) extends away from the user into the scene (or if printed on paper, "into" the paper).

FIG. 3 generally shows the conversion of input vertex data from model space 302 to world space 304, from world space 304 to view space 306, from view space 306 to projection space 308, and from projection space 308 to screen space 310. Typically, multiple matrices are used to perform each transformation. These matrices can be concatenated to provide a single transformation matrix that contains the aggregate transformation effect of the individual matrices.

The geometry pipeline 300 begins in so-called model space 302. A "model" refers to an object that will be included in the rendered scene, such as a character, weapon, vehicle, tree, etc. Each model includes a plurality of vertices (points in space) associated therewith. Model space 302 is a frame of reference that defines a model's vertices relative to an origin local to the 3-D model. Thus, if the model pertained to a human character, the model space 302 might provide vertices relative to an origin located at the center of the human character.

The geometry pipeline 300 next transforms model space 302 into world space 304. In world space 304, vertices are defined relative to a global origin common to all the objects (models) in a scene. In other words, the world transformation assembles models into a scene, and defines a common point of reference for determining different locations in the scene.

The geometry pipeline 300 next transforms world space 304 into view space 306 (also referred to as "camera space"). A "view" or a "camera" defines the vantage point from which a viewer observes the scene. Accordingly, the world space coordinates are relocated and rotated around this vantage point to provide the view space 306. More specifically, view space (or camera space) 306 refers to a frame of reference in which the viewer is at the origin, looking in the direction of the positive Z-axis into the viewing volume (also referred to as a "viewing frustum").

The geometry pipeline 300 next transforms view space 306 into projection space 308. In this transformation, objects in view space 306 are scaled with relation to their distance from the viewer in order to give the illusion of depth to a scene. That is, close objects are made to appear larger than distant objects, and so on. The resultant projection space 308 is a homogeneous cuboid space in which all vertices in a scene have X- and Y-coordinates that range from −1.0 to 1.0, and a Z-coordinate that ranges from 0.0 to 1.0.

Finally, the geometry pipeline 300 transforms perspective space 308 into screen space 310. Screen space 310 refers to a frame of reference in which coordinates are related directly to 2-D locations in a frame buffer, to be displayed on a monitor or other viewing device. The origin, or (0,0), is defined to be the upper left corner. The "Y" axis increases in the downward direction, and the "X" axis increases to the right.

Figure 4:
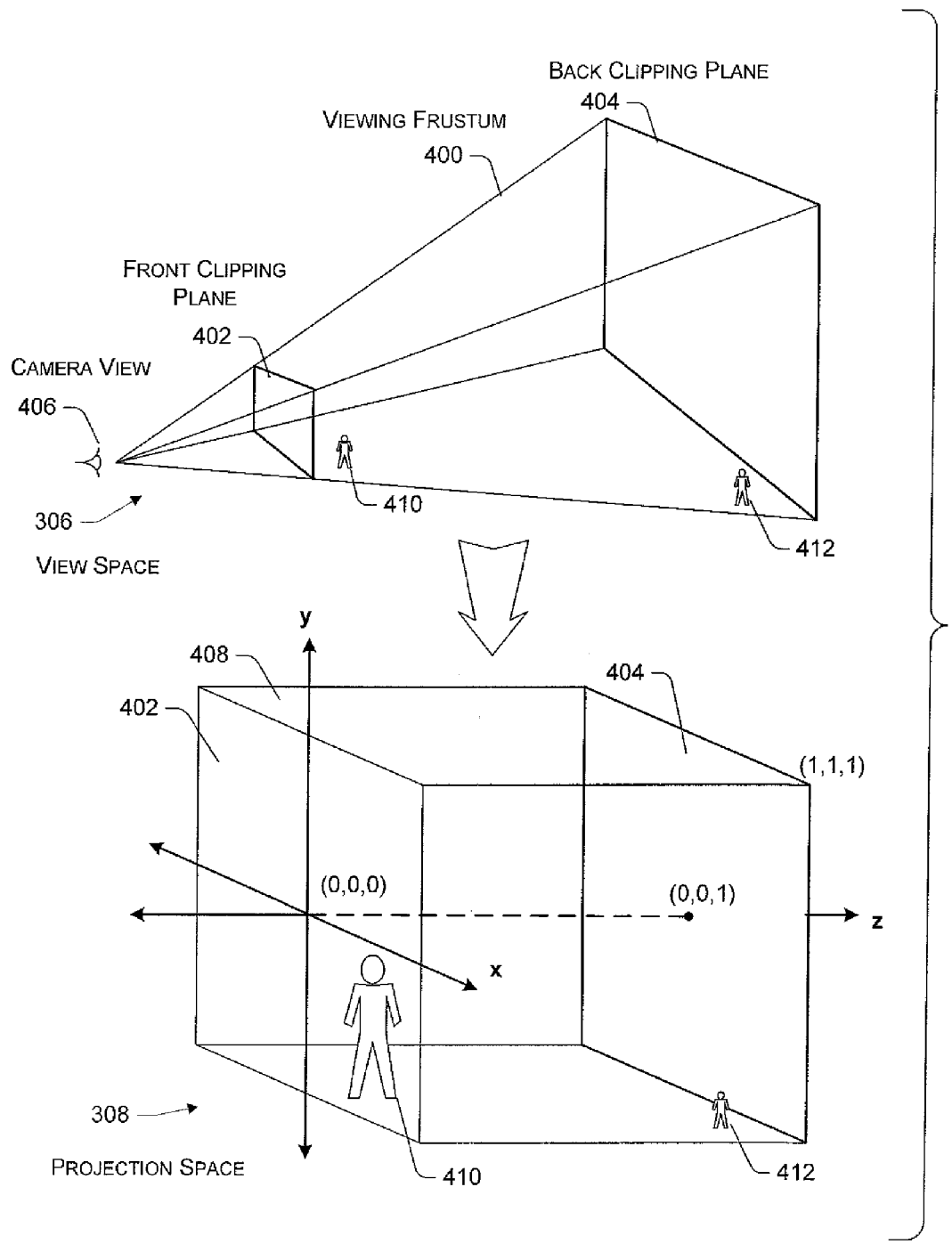
FIG. 4 shows an exemplary viewing frustum produced by the geometry pipeline in FIG. 3.

FIG. 4 shows a viewing frustum 400 produced in view space 306, and subsequently transformed into projection space 308. With reference to the view space 306 depiction, the viewing frustum 400 is bounded on one end by a front clipping plane 402, and on the other end by a back clipping plane 404. The outer "walls" of the viewing frustum 400 converge at a point, referred to as the camera view 406. Accordingly, the viewing frustum 400 assumes a truncated pyramidal shape. The projection transformation subsequently transforms this truncated pyramidal shape into a cuboid volume 408 in projection space 308 having X- and Y-coordinates that range from −1.0 to 1.0 and a Z-coordinate that ranges from 0.0 to 1.0

With reference to the view space 306 depiction, a viewer "looks into" the viewing frustum scene from the vantage point of the camera view point 406. When rendered, objects close to the front clipping plane 402 will appear close to the viewer, and objects far from the front clipping plane 402 will appear far away from the viewer. Objects that lie entirely outside the viewing frustum 400 are not rendered for display. For instance, FIG. 4 shows two exemplary objects (410 and 412) located in the viewing frustum 400 in view space 306. Object 410 is closest to the front plane 402, and therefore will appear to be closest to the viewer when the scene is rendered. Object 412 is located farthest from the front plane 402, and therefore will appear to be farthest from the viewer when the scene is rendered. In projection space 308, to provide the necessary perspective effect, objects become smaller as they move away from the front clipping plane 402. For instance, object 412 is smaller than object 410.

Figure 5:
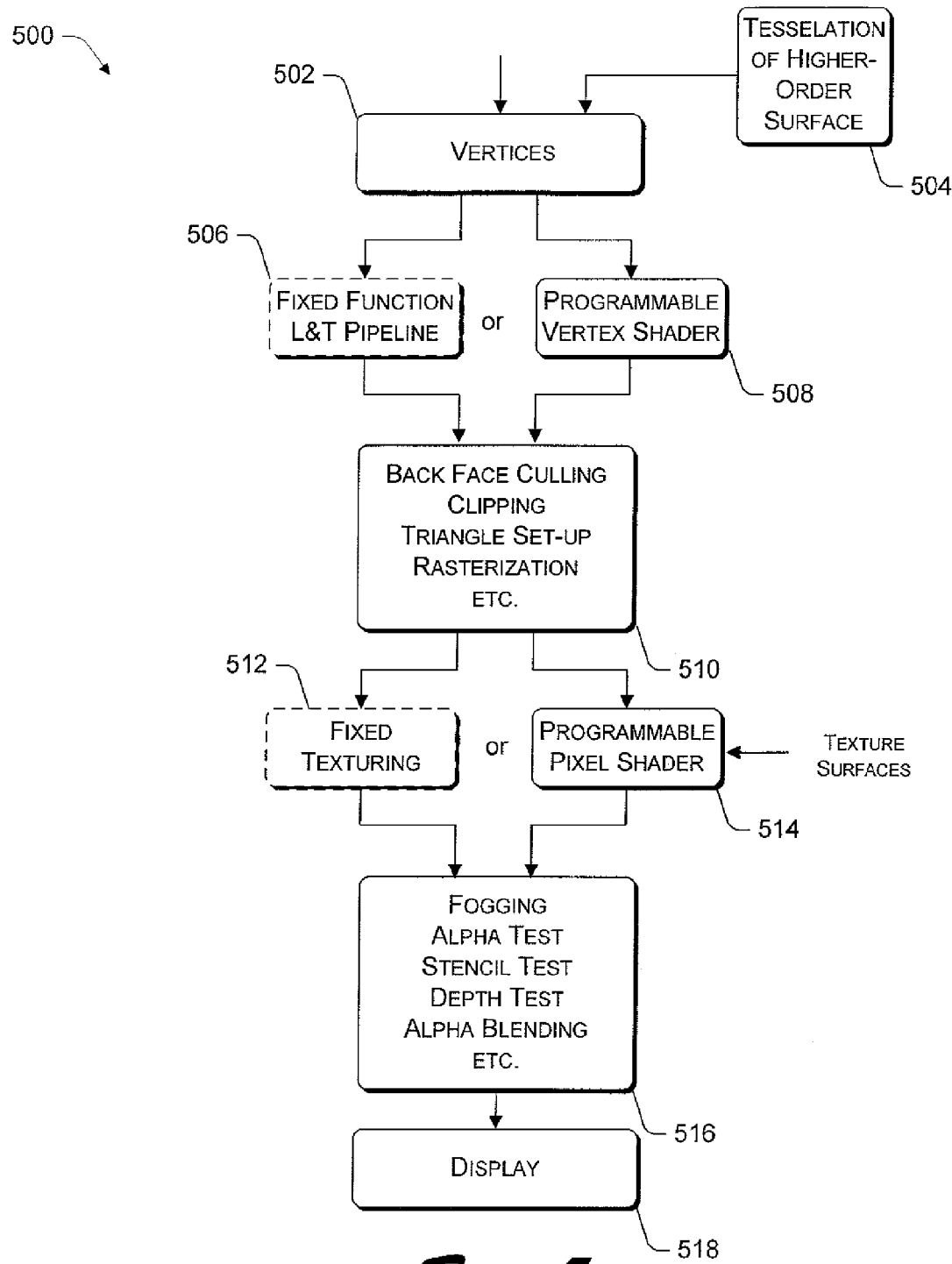
FIG. 5 shows an exemplary three dimensional processing pipeline for use in the generation of the glow effect.

FIG. 5 shows an exemplary graphics pipeline 500 for transforming input data into a final rendered 3D display. The various steps in FIG. 5 correspond to different processing stages. The processing stages may operate in parallel; that is, while the lower stages are processing one scene, the early stages are occupied with inputting and processing a next scene.

In operation 502, the processing pipeline 500 receives input data in the form of vertices. More specifically, the input operation may comprise specifying a collection of models which will populate a scene. Models are formed from an assemblage of primitives, which, in turn, are formed from a plurality of vertices. Triangles are common primitives. The input may also include models that include so-called "higher-order surfaces," such as B-spline surfaces, Bézier surfaces, n-patches, etc. However, before processing these surfaces, the 3D pipeline 500 breaks these surfaces down into more elementary primitives, such as triangles. The process of breaking down these higher order surfaces is referred to as tessellation 504.

Steps 506 and 508 include performing vertex operations on the vertex data assembled in step 502. In the Microsoft® DirectX® 8.(n) processing tool, a designer may choose between a conventional fixed lighting and transformation (L&T) pipeline 506 to perform this task, or a programmable vertex shader 508. As the name suggests, the fixed L&T pipeline 506 cannot be modified by the designer, beyond inputting setup parameters to govern its operations. In contrast, the designer can tailor the operations performed by the programmable vertex shader 508 by appropriately programming the vertex shader 506. In general, the L&T pipeline 506 and the programmable vertex shader 508 can be used to geometrically transform the vertex data (in the manner described above in the context of FIG. 3) and apply lighting (e.g., shading) to the vertex data.

Step 510 includes a plurality of operations. A backface culling operation removes those triangles that would not be visible because they face away from the viewer. This can reduce the processing load on the pipeline by eliminating, on average, half of the world triangles in the scene.

A clipping operation removes or modifies primitives that lie outside the viewing frustum 400. That is, any triangle that lies entirely outside the viewing frustum 400 will be eliminated. Any triangle that lies partially outside the viewing frustum 400 will be clipped accordingly.

At this point, the objects to be rendered still have not been "fleshed out" by applying pixels to the objects' primitives. The triangle set-up operation and the rasterization operation perform this task. Namely, the triangle set-up operation defines the pixel coordinates for the outlines of triangles in a scene, and performs other set-up related tasks in preparation for the rasterization operation. The rasterization operation assigns pixels to surfaces of the triangles using the results of the set-up operation. It performs this task by interpolating color and depth values based on the values computed in the set-up operation.

Figure 6:
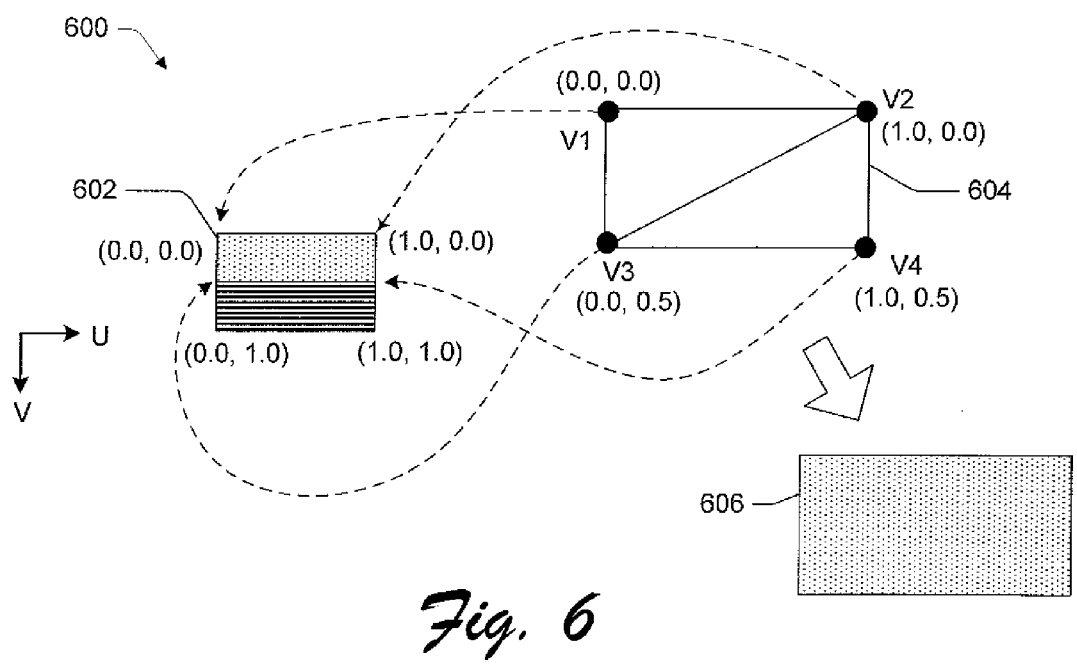
FIG. 6 shows an exemplary application of a texture to a polygon.
Figure 7:
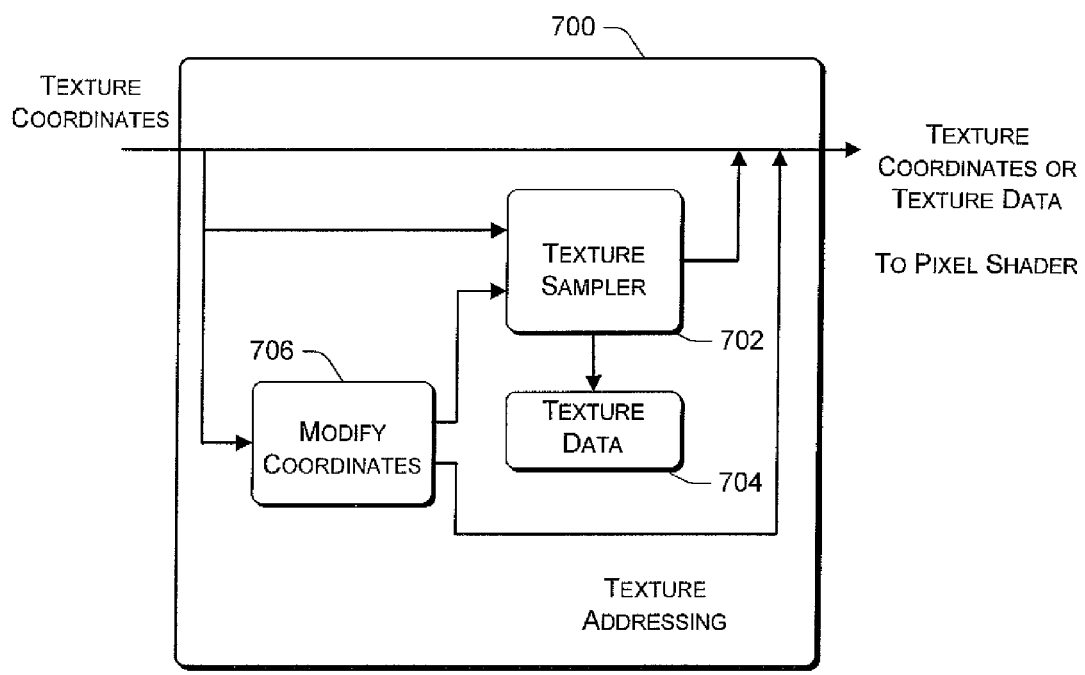
FIG. 7 shows an exemplary texture addressing module for use in the processing pipeline of FIG. 5.

The remaining steps in the pipeline now operate on pixel data, rather than vertex data. For instance, steps 512 and 514 can be used to perform a variety of pixel-level operations, such as adding textures to the surfaces of the primitives. A texture is a bitmap image that is, in effect, "pasted" onto the surfaces of the primitives at a location specified by texture coordinates supplied by earlier stages in the processing pipeline 500. Textures can be used to provide realistic looking scene content to the primitives, such as brick wall detail, wood grain detail, clothing detail, skin and facial expression detail, and so on. A texel refers to a single element in a texture. FIGS. 6 and 7, to be discussed shortly, provide additional details regarding texture processing operations performed in the processing pipeline 500.

Figure 8:
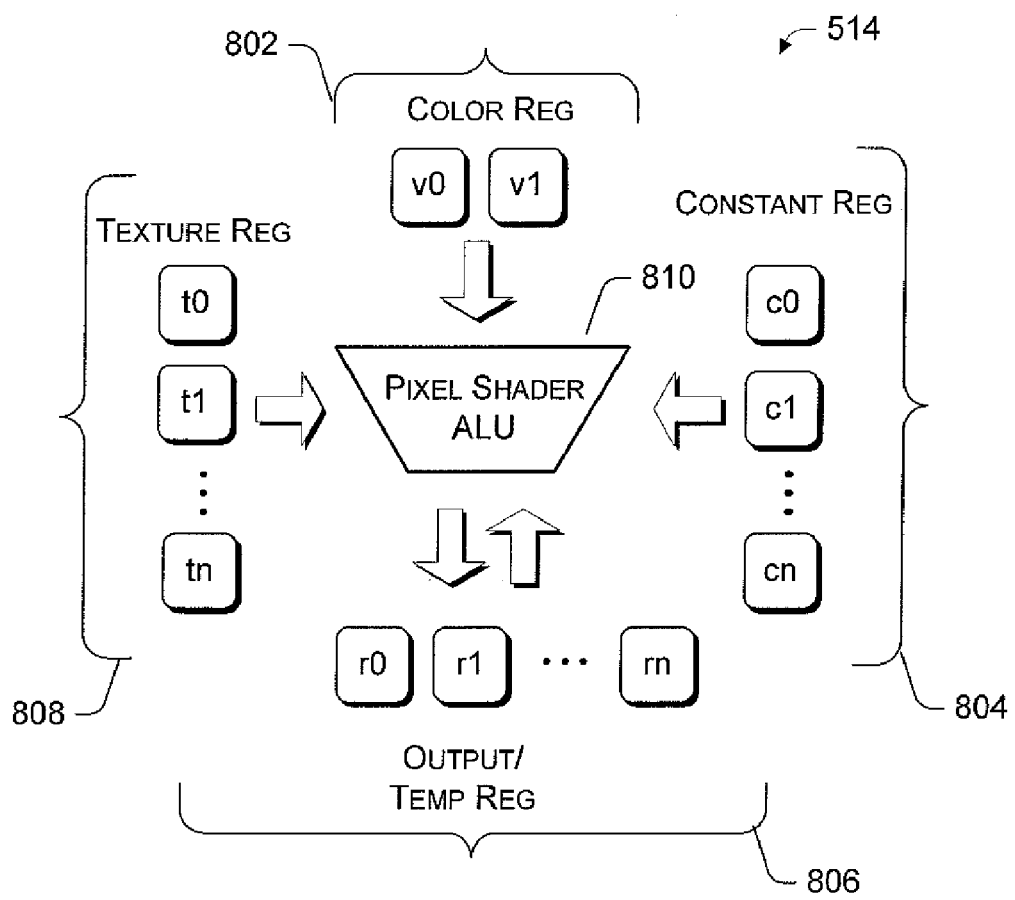
FIG. 8 shows an exemplary pixel shader for use in the processing pipeline of FIG. 5.
Figure 9:
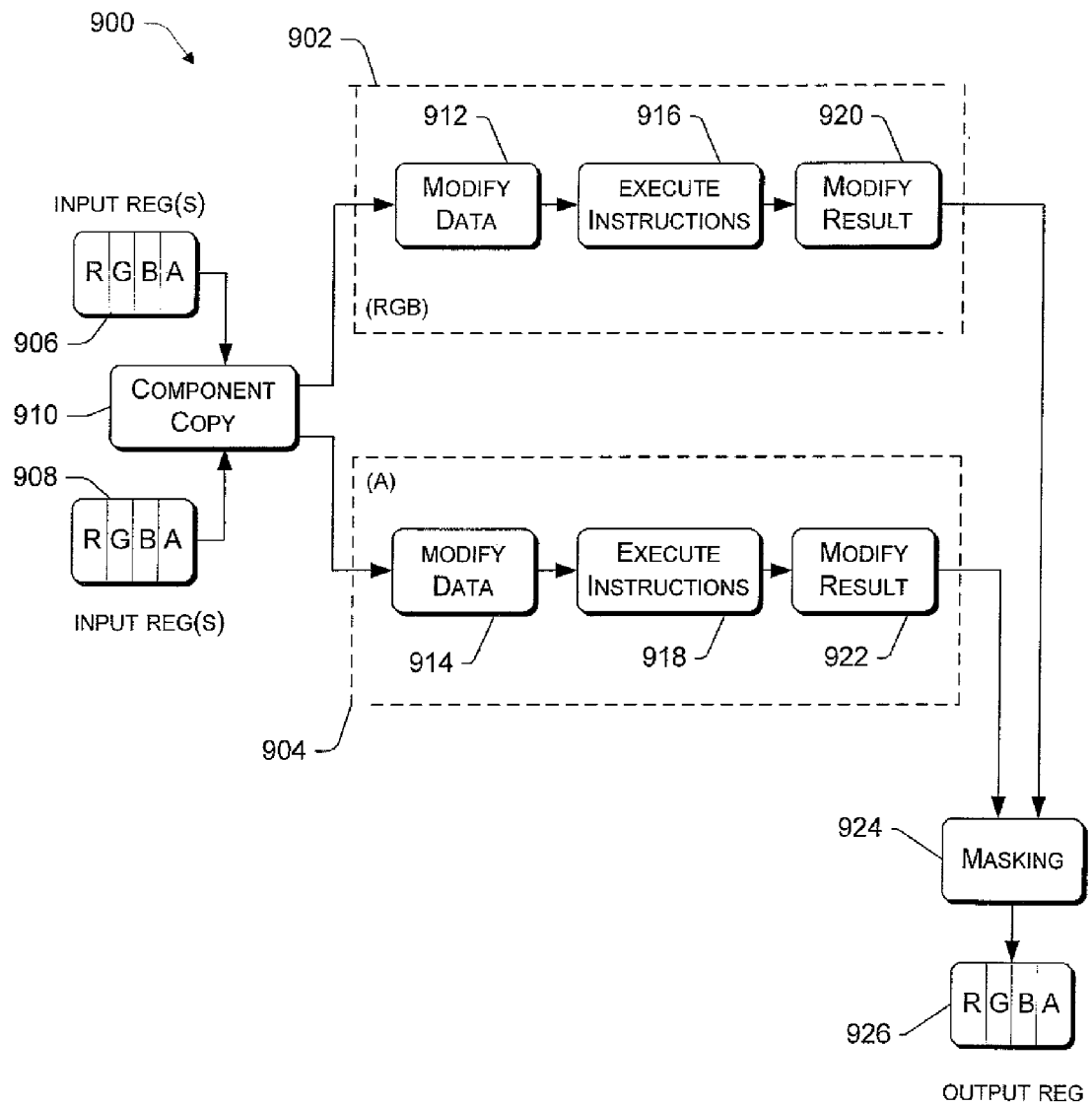
FIG. 9 shows an exemplary processing pipeline used by an arithmetic logic unit of the pixel shader shown in FIG. 8.

Again, the Microsoft® DirectX® 8.(n) rendering tool gives the user the option of performing pixel-based operations using a fixed multi-texturing operation 512 or a programmable pixel shader 514. In one implementation, the generation of the glow effect is performed using the programmable pixel shader 514, and hence emphasis will be placed on this unit in the ensuing discussion. FIGS. 8 and 9, to be discussed shortly, provide additional details regarding the programmable pixel shader 514. In general, the pixel shader 514 can be used to perform various pixel-level operations on color data (received from the L&T pipeline 506 or vertex shader 508) and texture data on the basis of instructions provided to the pixel shader 514.

Step 516 groups together several operations that can be performed on the output of the pixel shader 514 (or fixed module 512). The fogging step can be used to apply a fog visual effect to the developing scene. Fog can be implemented by blending the color of objects in a scene with a chosen fog color based on the depth of an object in a scene or its distance from the viewpoint. As objects grow more distant, their original color increasingly blends with the chosen fog color, creating the illusion that the object is being increasingly obscured by tiny particles floating in the scene.

An alpha test performed in step 516 serves to remove pixels that would not be visible based on their alpha values. That is, a pixel has color channels corresponding to red (R), blue (B), green (G), and alpha (A) components. An alpha value reflects the transparency of the RGB aspects of the pixel when rendered to a scene. The alpha test compares the alpha value with a reference threshold, and discards pixels that have alpha values that are below this threshold.

Figure 10:
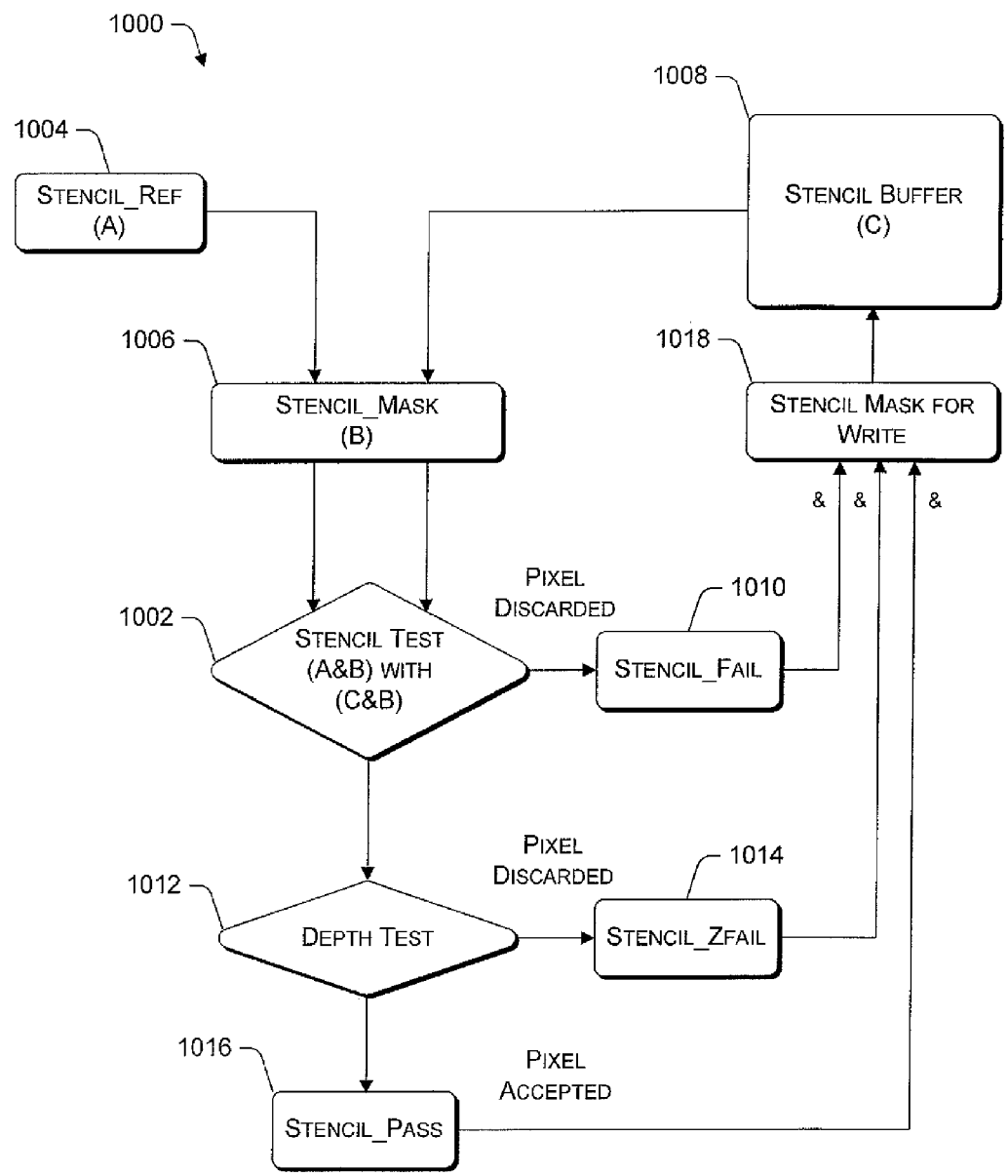
FIG. 10 shows exemplary stencil logic for use in the processing pipeline of FIG. 5.

The stencil test masks a pixel under consideration with information provided in a stencil buffer. A stencil buffer operates in the same manner as a physical stencil. For instance, a certain scene can be projected within a boundary defined by the stencil, and excluded outside the boundary. For instance, in a flight simulator, a stencil buffer may be set up to govern the display of scenery through the window of the cockpit, where the stencil defines the contours of the cockpit window. FIG. 10, to be discussed shortly, provides additional information regarding the stencil logic.

The depth test examines a depth buffer to determine whether a pixel under consideration (referred to as a test pixel here) is visible. It performs this task by comparing depth information associated with the test pixel with depth information stored in the depth buffer. According to one exemplary procedure, if the depth buffer indicates that another pixel is located closer to the camera than the test pixel at a corresponding location, that other pixel occludes the test pixel, and the test pixel will not be visible in the rendered scene. In this event, the test pixel is removed. If the test pixel has a depth value that is smaller than the depth value stored in the depth buffer, then the depth value of the test pixel replaces the depth value stored in the depth buffer. In this manner, the depth buffer maintains a record of only the visible entries within the viewing frustum 400. Other procedures can be used to perform the depth test than the procedure described above.

The blending operation serves to blend a pixel into a pre-existing scene. The blending operation is governed by the following equation:

Final color=source color*source blend factor+destination color*destination blend factor.

In this equation, the destination pixel color represents the color of the pixel in the pre-existing scene, and the source pixel color represents the new pixel color that the blending engine intends to add to the destination pixel. The blending factors vary from 0 to 1 and are used to control how much contribution the source and the destination pixel colors have in the final color value. In the extreme case, if the source blending factor is 1 and the destination blend factor is 0, then the new pixel color will entirely replace (e.g., overwrite) the destination pixel color.

Although not illustrated, step 516 can also include a number of other conventional pipeline operations, such as dithering, etc.

Finally, in step 518, the final scene is displayed. A common pipeline strategy is to render the scene under development to a back buffer while a previous scene is being projected to a screen using a front buffer. Once the scene under development is ready for display, the back buffer assumes the role of the front buffer, and the front buffer assumes the role of the back buffer (for rendering the next scene). Scenes are projected onto the game playing monitor for typically a very short time, such as 17 ms.

FIGS. 6 and 7 provide details on the application of textures to polygon surfaces. To begin with, FIG. 6 shows a texturing application operation 600 in which a texture 602 is applied to a polygon 604. The polygon 604 is comprised of two triangle primitives assembled to form a rectangle. The polygon 604 includes four vertices, V1, V2, V3, and V4. Each vertex includes texture coordinates. The texture coordinates are specified with respect to a conventional U and V reference system. In this reference system, the U coordinate generally corresponds to an X axis, and the V coordinate generally corresponds to a Y axis. Values in the U axis are clamped to range from 0.0 to 1.0, and values in the V axis are likewise clamped to range from 0.0 to 1.0.

The texture coordinates associated with the vertices specify how the texture 602 is to be placed onto the polygon 604. In the exemplary case of FIG. 6, vertex V1 has texture coordinates of 0.0, 0.0, which corresponds to the upper left corner of the texture 602. Vertex V2 has texture coordinates 1.0, 0.0, which corresponds to the upper right corner of the surface 602. Vertex V3 has texture coordinates 0.0, 0.5, which corresponds to the middle of the left edge of the texture 602. And vertex V4 has texture coordinates 1.0, 0.5, which corresponds to the middle of the right edge of the texture 602. Accordingly, when the texture 602 is mapped onto the polygon 604 in accordance with the texture coordinates, only the upper half of the texture 602 will be applied to the polygon 604. The result of the application of texture 602 to the polygon 604 is shown in textured surface 606.

The pixel shader 514 (or fixed function module 512) receives the texture coordinates from the vertex shader 508 (or fixed function module 506), and then proceeds to add the textures to the vertices on the basis of texture coordinates. FIG. 7 provides further details on this process. Namely, FIG. 7 includes a texture addressing module 700 which performs various operations on the basis of input texture coordinates. In one scenario, the texture addressing module 700 performs no operations on the input texture coordinates, and simply passes the texture coordinates to the pixel shader 514. In another scenario, a texture sampler 702 samples texture data 704 on the basis of the input texture coordinates. The resultant texture data 704 extracted in the sampling processing is then forwarded to the pixel shader 514. In another scenario, a modification module 706 is used to modify the input texture coordinates. These modified coordinates can then be forwarded to the texture sampler 702, or forwarded directly to the pixel shader 514.

The texture sampler module 702 can perform a variety of sampling operations. Generally, a texture is composed of a collection of texture elements (referred to as texels). The primitives, however, have already been populated with pixels in the rasterization process. There is generally no one-to-one correspondence between texel data and pixel data, thus requiring the texture sampler 702 to adapt the texel data to surfaces that it is mapped onto. In a nearest-point sampling operation, the sampler module 702 simply retrieves a texel with the closest integer address to an input texture coordinate. In a linear texture filter operation, the texture sampler 702 computes a weighted sum of the texels that are immediately above, below, to the left of, and to the right of the nearest sample point in a texture. Still other techniques can be used to sample texel data on the basis of input texture coordinates.

FIG. 8 shows the pixel shader 514 that appears in the processing pipeline 500 discussed above. The pixel shader 514 architecture includes a series of input/output registers (802, 804, 806, 808), and an arithmetic logic unit (ALU) 810 for performing operations on the input data. More specifically, the registers include color registers 802. These registers 802 stream iterated vertex color data from the vertex shader 808 or the fixed function L&T pipeline 506 to pixel shader 514. The constant registers 804 provide user-defined constants to the pixel shader 514. The output/temporary registers 906 provide temporary storage for intermediate calculations. Within this register set, the register r0 also receives an output of the pixel shader 514. The texture registers 808 provide texture data to the pixel shader ALU 810. The pixel shader ALU 810 executes arithmetic and texture addressing instructions.

FIG. 9 illustrates the flow 900 of operations in the pixel shader ALU 810. As indicated there, the flow includes two parallel pipelines (1002, 1004). The upper pipeline 902 provides a vector pipeline, which operates on vector data. Vector data is also called color data and contains three channels (RGB) of data. The bottom pipeline 904 is a scalar pipeline which operates on a single alpha data value. The pipeline is commonly referred to by the data type operated on, so the vector pipeline 902 is commonly called the color pipe and the scalar pipeline 904 is commonly called the alpha pipe.

In FIG. 9, the input registers 906 and 908 provide input data for the pixel shader 514, e.g., either RGB values for the RGB pipe 902 or alpha values for the alpha pipe 904. The component copy module 910 performs a source register selection function by copying data from one channel into other channels. This is commonly called swizzling. The modify data modules (912, 914) modify data read from source registers before an instruction is executed. The execute instruction modules (916, 918) are used to perform arithmetic and texture address operations on the pixel data. The modify result modules (920, 922) modify the results of the instructions before they are written to an output register. The masking module 924 controls which components (i.e., R, G, B, A channels) of the destination register are written by the instruction. Finally, at the end of the pipeline, the output register 926 (e.g., output register r0) stores the output color. In general, the color and alpha pipes (902, 904) do not have to execute the same instruction or have the same source registers.

Figure 12:
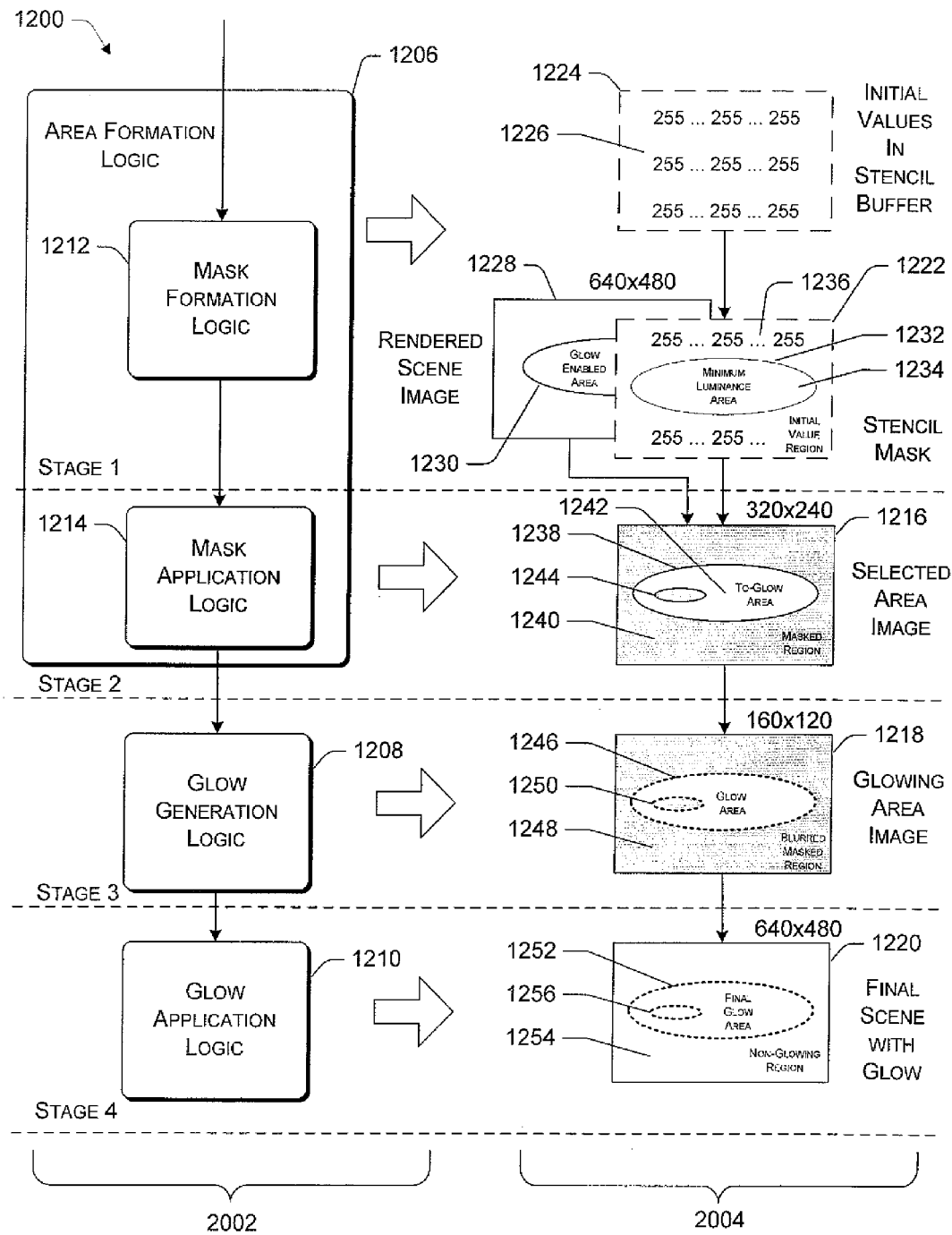
FIG. 12 shows exemplary logic used to generate the glow effect according to the first implementation.

The function of the above-indicated modules will become clearer in the context of the ensuing discussion of FIG. 12, which provides specific instructions that can be used to generate the glow effect.

Finally, FIG. 10 shows exemplary stencil and depth test logic 1000 for use in the processing pipeline of FIG. 5. The stencil logic 1000 enables or disables drawing to a rendering target surface on a per pixel basis. Among other uses, the stencil logic 1000 allows applications to mask sections of the rendered image so that they are not displayed. Applications often use stencil logic 1000 for special effects such as dissolves, decaling, and outlining.

The logic 1000 includes stencil test 1002 which performs a comparison test by performing a logical operation on a STENCIL_REF value 1004 (referred to as value A), a STENCIL_MASK value 1006 (referred to as value B), and a stencil value stored within stencil buffer 1008 (referred to as value C). The STENCIL_REF value 1004 is a single integer value providing a reference value. The STENCIL_MASK value 1006 is also a single value which effectively masks whatever it is combined with to select a particular bit plane (e.g., by determining the significant bits used in the stencil test 1002). The stencil buffer 1008 includes a collection of stencil values associated with pixels within a rendered scene. More specifically, when a scene is rendered, the processing pipeline 500 (in FIG. 5) outputs a rendered scene to the back buffer, and also generates corresponding stencil values for storage in the stencil buffer 1008 providing that the stencil test is enabled). In terms of physical implementation, the stencil buffer 1008 and the depth buffer are commonly implemented as a single buffer. For instance, the stencil buffer 1008 may comprise a bit plane (or planes) within the depth buffer allocated for stenciling operations.

In operation, the stencil test 1002 performs a comparison of a masked STENCIL_REF value 1002 with a masked stencil value for each pixel in a scene. In other words, the stencil test 1002 compares value (A & B) with value (C & B), where the term "&" refers to a logical ANDing operation, and the symbols A, B, and C were defined above (corresponding to the STENCIL_REF value 1004, the STENCIL_MASK value 1006, and a stencil value taken from the stencil buffer 1008, respectively). The designer can specify the specific comparison function performed by the stencil test 1008.

If the stencil test 1002 fails, then the stencil logic 1000 advances to STENCIL_FAIL state 1010 and the pixel under consideration is discarded (meaning it is not rendered to the screen). If the stencil test 1002 passes, the stencil logic 1000 advances to the depth test 1012 (discussed above with respect to FIG. 5). If the depth test 1012 fails, the stencil logic 1000 advances to STENCIL_ZFAIL state 1014, and the pixel is discarded. However, if the depth test 1012 passes, the stencil logic 1000 advances to STENCIL_PASS state 1016. The outputs of the STENCIL_FAIL state 1010, the STENCIL_ZFAIL state 1014, and the STENCIL_PASS stage 1016 are fed to a stencil mask 1018, which selectively masks these outputs into a desired bit plane. The masked results are then fed back to the stencil buffer 1008.

In addition to specifying the comparison function performed by test 1002, the designer can also specific what operations are performed upon encountering the STENCIL_FAIL state 1010, the STENCIL_ZFAIL state 1014, and the STENCIL_PASS state 1016. For instance, the designer can specify that the stencil logic 1000 replaces the stencil value stored in the stencil buffer 1008 with the STENCIL_REF value 1004 upon encountering the STENCIL_PASS state 1016.

C. GLOW GENERATION METHOD AND APPARATUS

C.1. Overview

Figure 11:
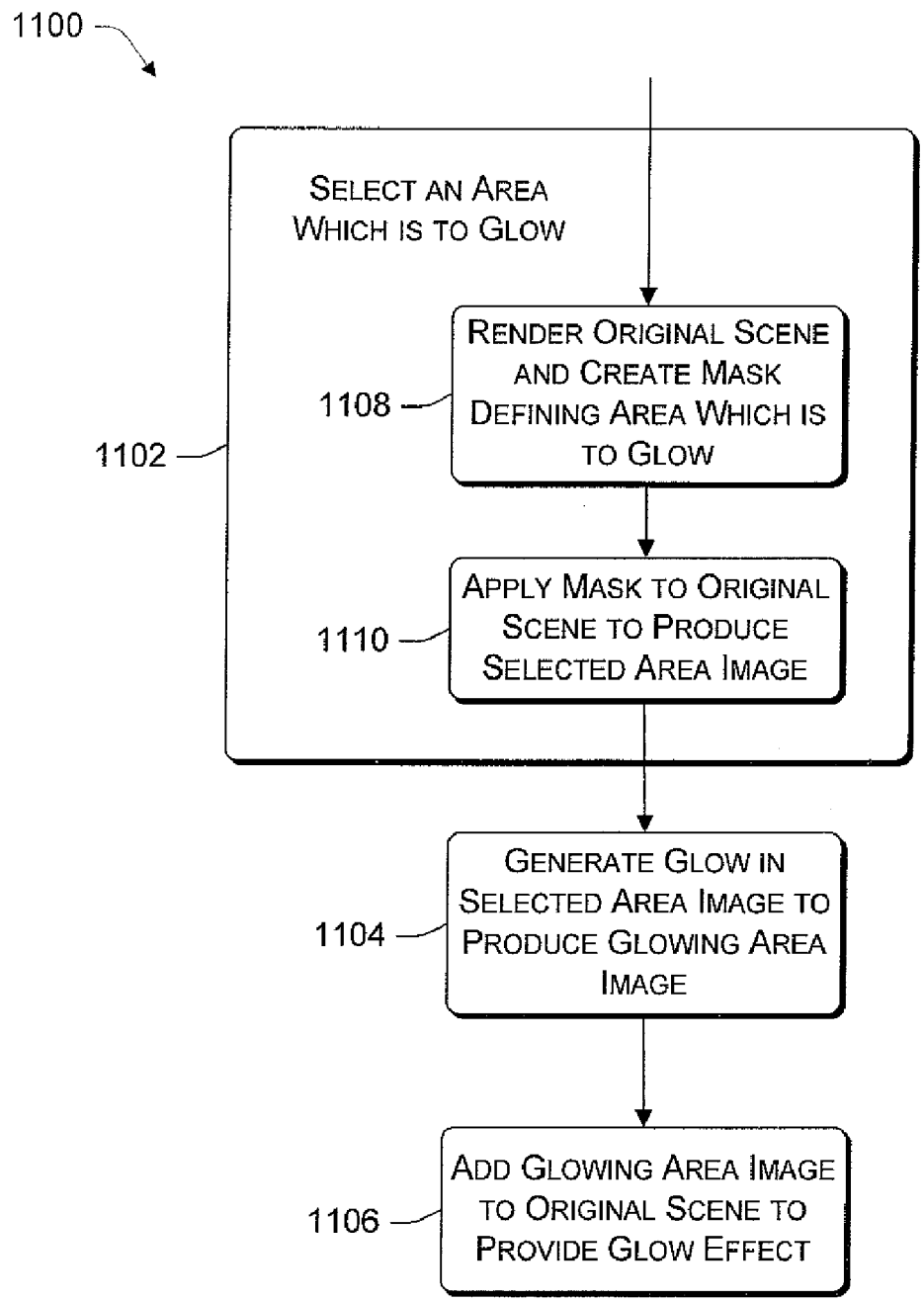
FIG. 11 shows an exemplary overview of a process for generating the glow effect according to a first implementation.

FIG. 11 shows a method 1100 which provides an overview of the generation of the glow effect according to a first implementation. In terms of broad steps, the method 1100 includes step 1102 which entails selecting an area within a scene that is to glow to produce a "selected area image," step 1104 which entails generating glow in the selected area image to produce a "glowing area image," and step 1106 which entails adding the glowing area image to the scene to provide the glow effect in a "final glow image." The step 1102 of selecting an area that is to glow, in turn, includes step 1108 which entails rendering the scene to provide a "rendered scene image" and, in the process, creating a mask that defines the area which is to glow. The step 1102 of selecting an area that is to glow also includes step 1110 which entails applying the mask to the rendered scene image to produce the selected area image.

FIG. 12 shows exemplary logic 1200 used to generate the glow effect. In general, the left side 2002 of FIG. 12 shows the logic 1200 that generally corresponds to the steps identified in FIG. 11. The right side 2004 of FIG. 12 identifies buffer contents produced by the logic 1200 shown on the left side 2002 of FIG. 12. By way of overview, the logic 1200 shown in the left side 2002 of FIG. 12 includes area formation logic 1206, glow generation logic 1208, and glow application logic 1210. The area formation logic 1206, in turn, includes mask formation logic 1212 and mask application logic 1214. This logic can be implemented in machine-readable code, or in function-specific processing modules, or in a combination of machine-readable code and function-specific processing modules.

The area formation logic 1206 functions to select an area within a scene that is to glow to produce a selected area image 1216. The glow generation logic 1208 functions to generate glow in the selected area image 1216 to produce a glowing area image 1218. And the glow application logic 1210 functions to add the glowing area image 1218 to the original scene to provide the glow effect in a final glow image 1220. Within the area formation logic 1206, the mask formation logic 1212 functions to create a mask 1222 that defines the area which is to glow. The mask application logic 1214 functions to apply the mask 1222 to produce the selected area image 1216.

The functions performed by each of the logic modules identified above will be discussed in further detail with reference to four processing stages, identified in FIG. 12 as Stage 1, Stage 2, Stage 3, and Stage 4. In the following discussion, pixels (or texels) within the scene buffers (e.g., within the back buffer) are referred to generically as "scene elements." Values within the stencil buffer 1008 (shown in FIG. 10) are referred to as "stencil values."

C.2. First Stage

In the first stage, mask formation logic 1212 produces the mask 1222 within the stencil buffer 1008 by first initializing the contents of the stencil buffer 1008 to a predetermined value. In one exemplary implementation, the mask formation logic 1212 initializes the stencil values within the stencil buffer 1008 so that all of the stencil values have the value 255. The night side 2004 of FIG. 12 illustrates exemplary stencil buffer contents 1224 having stencil values 1226 all set to the value 255.

The following exemplary series of instructions can be used to initialize the stencil buffer 1008:

(1) STENCIL_ENABLE=true
(2) STENCIL_PASS=STENCILOP_REPLACE
(3) STENCIL_REF=255.

The first instruction enables the stencil test 1002 performed in the stencil logic 1000 (shown in FIG. 10). The second instruction instructs the stencil logic 1000 to perform a replace operation in the event that a scene element (e.g., pixel) passes the stencil test 1002 and depth test 1012 (to thereby achieve the STENCIL_PASS state 1016). In the replace operation, the stencil logic 1000 inserts a reference value (STENCIL_REF 1004) in the stencil buffer 1008 when the STENCIL_PASS state 1016 is achieved. The third instruction identifies the reference value (STENCIL_REF 1004) as 255. Thus, each time the stencil test 1002 and depth test 1012 pass, the stencil logic 1000 inserts the value of 255 into the stencil buffer 1008, to fill the stencil buffer 1008 with the value of 255.

The mask formation logic 1212 then renders the scene to produce rendered scene image 1228 including the area which is to glow, referred to as "glow-enabled area" 1230. The mask formation logic 1212 performs this step in the above-described manner by rendering the scene using the processing pipeline 500 shown in FIG. 5. The processing pipeline 500 stores the rendered scene image 1228 in conventional fashion within a back buffer. As described in connection with FIG. 5, the back buffer defines a working buffer where scene content is rendered prior to projecting it to the screen. When the rendering is complete, the processing pipeline 500 switches the role of the back and front buffers, such that the back buffer becomes the front buffer and the front buffer becomes the back buffer.

In the course of rendering the scene, the mask formation logic 1212 generates the mask 1222 in the stencil buffer 1008. The mask formation logic 1212 performs this task by inserting minimum luminance values (e.g., Min_Luminance values) within the stencil buffer 1008 for stencil values associated with the glow-enabled area 1230. More specifically, the stencil logic 1000 (shown in FIG. 10) provided by the processing pipeline 500 performs the stencil test 1002 and depth test 1112 for each scene element within the rendered scene image 1228. If the tests pass, the mask formation logic 1212 inserts a minimum luminance value into the stencil buffer 1008 at a location associated with the scene element under consideration. If the tests fail, the mask formation logic 1212 leaves intact the previous value stored in the stencil buffer 1008, namely, the value of 255. The same series of instructions (1-3) identified above can be used to generate the mask 1222. However, in this case, the third instruction identifies the STENCIL_REF value as the minimum luminance value (e.g., STENCIL_REF=Min_Luminance).

In one implementation, each material that the processing pipeline 500 renders may have a glow attribute associated therewith. This glow attribute defines whether the material is to glow, and if so, the minimum luminance required for it to glow. (Material properties generally detail a material's diffuse reflection, ambient reflection, light emission, specular highlight characteristics, etc.) Accordingly, an object that uses a particular material that is "glow-enabled" will glow when rendered according to the techniques described herein. More specifically, the mask formation logic 1212 uses the glow attribute information to supply Min_Luminance values to the stencil logic 1000 on a per pixel basis. The stencil logic 1000 uses these values as STENCIL_REF values 1004.

The resultant mask 1222 produced by the mask formation logic 1212 includes a minimum luminance area 1232 corresponding to the area which is to glow (that is, corresponding to the glow-enabled area 1230). This minimum luminance area 1232 includes a plurality of minimum luminance values 1234 contained therein. The mask 1222 further includes an initial value region 1236 located outside of the minimum luminance area 1232. The initial value region 1236 is populated with stencil values having the initial value of 255 (because they have not been changed). In one implementation, the minimum luminance values 1234 in the minimum luminance area 1232 can vary for each stencil value within the minimum luminance area 1232. In another implementation, the minimum luminance values 1234 have the same value for all of the stencil values within the minimum luminance area 1232.

C.3. Stage 2

In stage 2, the mask application logic 1214 uses the stencil values within the mask 1222 to generate the selected area image 1216. By way of overview, the luminance values of scene elements (e.g., pixels) within the rendered scene image 1228 are calculated as a function of the respective red, green, and blue components of the scene elements. The calculated luminance values generally correspond to the associated brightness levels of scene elements in the displayed scene. The mask application logic 1214 then compares the calculated luminance values with associated stencil values stored in the mask 1222 to determine whether the calculated luminance values are greater than the associated stencil values. This comparison defines a masking test. If the masking test fails for a particular scene element, the mask application logic 1214 outputs a masking color for that scene element, such as black (which has the value of red=0, green=0, blue=0). If the masking test passes for a particular scene element, the mask application logic 1214 outputs a non-masking color for that scene element, such as the original color value of the scene element within the rendered scene image 1228.

As a result of the above mask test, scene elements having associated stencil values of 255 will be assigned the masking color (e.g., black). This is because, in the exemplary implementation discussed above, no calculated luminance value can exceed 255. On the other hand, non-black scene elements having associated stencil values of 0 will be assigned a non-masking color, because any scene element having a non-zero color value will have a corresponding luminance value that exceeds 0. Scene elements having associated stencil values between 1 and 254 may be assigned the masking color or a non-masking color depending on how their respective luminance values compare with their associated stencil values.

The resultant selected area image 1216 contains a "to-glow area" 1238 corresponding to the glow-enabled area 1230 in the rendered scene image 1228. Scene elements 1242 located inside the to-glow area 1238 are assigned a non-masking color. A masked region 1240 lies outside the to-glow area 1238. Scene elements located in the masked region 1240 are assigned the masking color (e.g., black). In addition, an exemplary masked subarea 1244 within the to-glow area 1238 may include scene elements with respective calculated luminance values that fall to exceed their associated minimum luminance values 1234 within the minimum luminance area 1232 of the mask 1222. Accordingly, the scene elements located within this masked subarea 1244 are assigned the masking color (e.g., black). The reader will appreciate that, for the purpose of explanation, arbitrary shapes were selected for the particular to-glow area 1238 and masked subarea 1244 shown in FIG. 12. Further, although only one to-glow area 1238 is shown in FIG. 12, the rendered scene image 1228 may include multiple to-glow areas. Further, although only one masked subarea 1244 is shown, a to-glow area may include plural such masked subareas (or potentially no such subareas).

The mask application logic 1214 can perform the above-described functions using the functionality of the pixel shader 514 (shown in FIG. 5) according to the following exemplary procedure. First, the mask application logic 1214 retrieves the rendered scene image 1228 from the back buffer as a first texture image. Then, the mask application logic 1214 retrieves the mask 1222 stored in the stencil buffer 1008 as a second texture. In one exemplary implementation, the first texture has an information context size of is 640×480 scene elements (e.g., texels), and the second texture also has an information context size of 640×480 elements (e.g., texels). The following two commands perform the above-described operations:

(4) tex t0

(5) tex t1

The fourth instruction assigns the rendered scene image 1228 stored in the back buffer to texture register t0 of the pixel shader 514. The fifth instruction assigns the mask 1222 stored in the stencil buffer 1008 to the texture register t1 of the pixel shader 514.

The mask application logic 1214 is now ready to generate the selected area image 1216 using the above-described two textures. The mask application logic 1214 performs this task for each scene element (e.g., pixel) by: (1) calculating the luminance value of the scene element stored in the texture register t0; (2) comparing this calculated luminance value with the associated stencil value stored in the texture register t1; and (3) providing a masking color or a non-masking color based on the results of the comparison. The following series of instruction can be used to execute these functions:

(6) dp3 r1, c0, t0

(7) sub r0, t1.*a*, r1_bias.a (8) cnd r0, r0.*a*, zero, t0.

The sixth instruction calculates the luminance of the scene element stored in the texture register t0. Namely, the "dp3" instruction performs a three-component dot product using the information stored in the texture register t0 and constant register c0, and then stores the results of the dot product into destination register r1. In other words, the "dp3" instruction performs the computation: $r1=(c0_{red}*t0_{red})+(c0_{green}*t0_{green})+(c0_{blue}*t0_{blue})$, where $c0_{red}$, $c0_{green}$, and $c0_{blue}$ are the red, green and blue channel components of the constant register c0, respectively, and $t0_{red}$, $t0_{green}$, and $t0_{blue}$ are the red, green and blue channel components of the texture register to, respectively. The luminance value stored in the destination register r1 generally reflects the brightness of the scene element. The "dp3" instruction also replicates the scalar results of the dot product into all of the channels (RGBA) of the destination register r1.

The seventh instruction subtracts the contents stored in register r1 from the contents stored in texture register t1 and stores the results in the destination register r0. The suffix ".a" in the subinstruction "t1.*a*" replicates the alpha channel in the register t1 into all of the channels (RGBA). The suffix ".a" in the subinstruction "r1_bias.a" performs the same task with respect to the register r1. The suffix "bias" in the subinstruction "r1_bias.a" subtracts a value of 0.5 from the value stored in register r1. Accordingly, as a whole, the seventh instruction subtracts 0.5 from the calculated luminance value (previously stored in register r1 by the sixth instruction), and then subtracts the resultant value from the stencil value stored in register t1.

The eighth instruction conditionally selects between the value zero and the results stored in the texture register t0 based on a determination of whether the value stored in register r0 is greater than 0.5. The results of this comparison are stored back into register r0. Again, the suffix ".a" in the subinstruction "r0.*a*" replicates the contents of the alpha channel of register r0 to all of the other channels (RGBA).

In summary, the above-identified instructions execute the following tasks: (a) calculate the luminance of a scene element stored in the first texture as a function of the RGB components of the scene element and the contents in the constant register c0; (b) compare the calculated luminance with the associated stencil value stored in the second texture; and (c) generate an output color based on this comparison. If the calculated luminance is not greater than the stencil value stored in the second texture, then the mask application logic 1214 outputs a masking color, which, in this case is black, corresponding to the value of 0, 0, 0 (that is, red=0, green=0, and blue=0). If the calculated luminance is greater than the stencil value stored in the second texture, then the mask application logic 1214 outputs the original color value stored in the first texture (corresponding to the original color value in the rendered scene image 1228 in the back buffer). A resultant selected area image 1216 is thus generated having the exemplary masking characteristics discussed above.

In one exemplary implementation, the mask application logic 1214 generates a selected area image 1216 having a smaller information content size than the input first and second textures. For instance, as discussed above, the first texture formed from the rendered scene image 1228 has an information content size of 640×480, and the second texture formed from the mask 1222 also has an information content size of 640×480. In one exemplary implementation, the mask application logic 1214 performs the above-identified masking operations to generate the selected area image 1216 having an information content size of 320×240 (which is one fourth the information content size of the input first and second textures). Bilinear interpolation can be used to down-sample the 640×480 textures into the 320×240 selected area image 1216.

C.4. Third Stage

In the third stage, the glow generation logic 1208 takes the selected area image 1216 and generates the glowing area image 1218. The glow generation logic 1208 performs this task by generating a weighted sum of different versions of the selected area image 1216. The multiple versions are offset from a reference center point by a prescribed amount in different respective directions (such as left, right, up, down, diagonally up/left, diagonally low/right, diagonally up/right, and diagonally down/left directions). In broad terms, this additive rendering procedure acts to move the selected area image 1216 in a circular path around the reference center point, additively rendering the selected area image 1216 at different positions in this circular path. Thus, the glow generation logic 1208 acts to smudge or blur the selected area image 1216 in a circular pattern.

Figure 13:
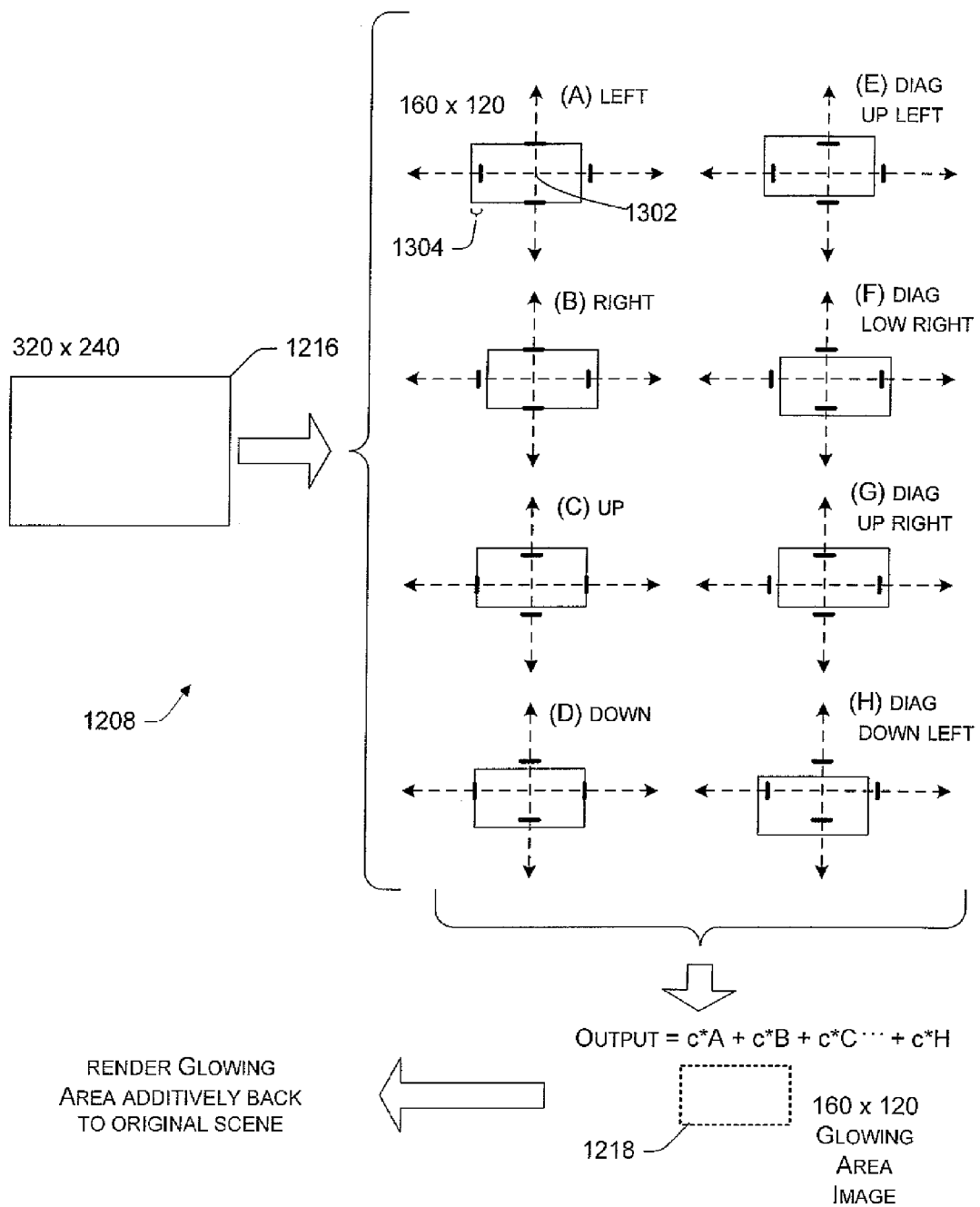
FIG. 13 shows exemplary glow generation logic for use in the logic of FIG. 12.

FIG. 13 shows the additive rendering operation performed by the glow generation logic 1208. As shown there, the glow generation logic 1208 takes the 320×240 selected area image 1216 and renders it into a smaller version (A) of the selected area image 1216 using bilinear interpolation. In the exemplary case of FIG. 13, version (A) has an information content size of 160×120 scene elements (e.g., texels). In performing this down-sampling, the glow generation logic 1208 also multiplies the color values in the selected area image 1216 by a scaling factor "c" (such as, for example, 0.1, 0.2, etc.), so that each of the color values within the resultant first version (A) are multiplied by this scaling factor c. Version (A) is shown relative to a reference center point 1302. More specifically, version (A) is offset from this reference center point 1302 (to the left) by an offset amount 1304.

The glow generation logic 1208 then generates a second version (B) of the selected area image 1216 and adds version (B) to version (A). Version (B) also has an information content size of 160×120 scene elements (e.g., texels), but is offset with respect to the reference center point 1302 in a different direction than version (A), namely to the right of reference center point 1302. In adding version (A) to version (B), the glow generation logic 1208 adds color values in version (A) to associated color values in version (B). In general, adding a color value "x" to a color value "y" will produce a color value "z" having a larger numerical value than x or y (supposing that neither x nor y have the value 0, 0, 0, corresponding to the color black). Increasing the numerical value of a color increases the luminance of the corresponding scene element. For instance, the brightest value corresponds to 255, 255, 255 (that is, red=255, green=255, and blue=255). However, in producing the version (B), the glow generation logic 1208 again multiples the color values in the selected area image 1216 by a scaling factor c, so that each of the color values within the resultant second version (B) is multiplied by this scaling factor c. The use of the scaling factor c scales down the color values in the resultant summation of versions (A) and (B) to prevent the color values in the resultant summation from saturating (that is, exceeding a maximum at 255).

The procedure discussed above is repeated for different versions that are offset in different directions. Namely, the glow generation logic 1208 additively renders the selected area image 1216 another time with respect to a version (C) that is offset in the "up" direction relative to reference center point 1302. The glow generation logic 1208 then additively renders the selected area image 1216 another time with respect to a version (D) that is offset in the "down" direction relative to reference center point 1302, and so on. Each time another version is generated, its color values are scaled by the g scaling factor c and added to the previous image sum. Accordingly, presuming that exemplary versions (A) through (H) are additively rendered, the resultant glowing area image 1218 has color values defined by the equation:

$$\text{output color} = c*A + c*B + c*C + \ldots c*H. \tag{8}$$

As mentioned, the summation of multiple offset versions of the selected area image 1216 serves to blur the content of the selected area image 1216, because the selected area image 1216 has effectively been smudged in a circular pattern. The scaling factor "C" can be selected such that the resultant glowing area image 1218 has a desired brightness level. For instance, it may be desirable to select a scaling factor c that will brighten the glow-enabled region 1230 by some amount (compared to its appearance in the non-glowing state), as this will realistically simulate the effects of glow in the physical realm (where an object appears to radiate light). But it may be undesirable to select too large of a scaling factor c, as this may result in the saturation of color values in the glowing area image 1218 (in which case the color values exceed a maximum at 255 due to the summation of multiple versions). In general, a game designer may tailor the constant c to provide the desired visual effect depending on the context of the application. It is also possible to use different scaling constants in the generation of the glow, such that different offset versions are multiplied by different respective scaling constants.

The example shown in FIG. 13 additively renders the selected area image 1216 in eight different directions about the reference center point 1302. This is merely illustrative of one example. It is possible to offset the selected area image 1216 in additional directions with respect to the reference center point 1302, or fewer directions. Further, the glow generation logic 1208 can make a second rendering pass. In the second pass, the glow generation logic 1208 can additively render another series of versions that are offset with respect to the reference center point 1302 by an offset amount that is larger than the first offset amount 1304. This second pass therefore effectively smudges the selected area image 1216 in another circular pattern having a larger radius than the first pass. Additional such passes are possible. Further still, the glow generation logic 1208 can smudge the selected area image 1216 by following other kinds of paths than a circular path, or by using other kinds of blurring techniques than the technique described above with reference to FIG. 13.

Returning to FIG. 12, the glowing area image 1218 includes basically the same image content as the selected area image 1216, but is blurred, smaller (160×120 texels), and potentially brightened. This blur is represented graphically by dotted lines within the glowing area image 1218. More specifically, the glowing area image 1218 includes a glow area 1246 corresponding to the to-glow area 1238 in the selected area image 1216. The glowing area image 1218 also includes a blurred masked region 1248 corresponding to the masked region 1240 in the selected area image 1216. This blurred masked region 1248 is colored black. The glowing area image 1218 also includes an exemplary blurred and masked subarea 1250 corresponding to the masked subarea 1244 in the selected area image 1216. The blurred and masked subarea 1244 is also colored black. Because of the blurring effect of the additive rendering, some of the color values within the glow area 1246 may have "bled" or "leaked" into the masked regions 1248 and 1250.

C.5. Stage 4

In the last stage, the glow application logic 1210 adds the 160×120 glowing area image 1218 back to the original scene to produce a final scene 1220 containing the glow effect. The resultant final scene image 1220 includes a final glowing area 1252 corresponding to the glow area 1246 in the glowing area image 1218. The final scene image 1220 includes a non-glowing region 1254 corresponding to the blurred masked region 1248 of the glowing area image 1218. Further, the final scene image 1220 includes a non-glowing subarea 1256 corresponding to the blurred and masked subarea 1250 within the glowing area image 1218. Because of the contribution of the blurring in the glowing area image 1218, the color values in the final glowing area 1252 may bleed into the non-glowing regions 1254 and 1256.

In performing the above-described glow application functions, the glow application logic 1210 up-samples the 160× 120 glowing area image 1218 to the size of the original scene in the working buffer (e.g., 640×480 texels). This up-sampling can be performed using bilinear interpolation. The glow application logic 1210 adds the glowing area image 1218 to the original scene by adding the color values in the glowing area image 1218 to the color values in the original scene (e.g., to the color values in the rendered scene image 1228). Each of the masked scene elements has a color of black, which means that its numerical color value is 0, 0, 0 (that is, red=0, green=0, blue=0). Accordingly, adding these black color scene elements to the original scene does not produce a discernable visual effect. In other words, the masked regions are effectively transparent when rendered back to the original scene. On the other hand, the color values in the glow area 1246 in the glowing area image 1218 contribute non-zero values to the color values in the original scene, and thus affect the visual appearance of the final scene.

By virtue of the above procedure, the final scene image 1220 includes an object associated with the final glow area 1252 that appears to be glowing. This glow effect resembles the phenomenon of glow in the physical realm. More specifically, the glowing object may appear to be slightly brighter than its appearance in a non-glow state, making it appear that the object is radiating light. Also, the color values from the glowing object may bleed or leak into the non-glowing regions of the final scene image 1220, again making it appear that the object is radiating light into the neighboring terrain.

Figure 14:
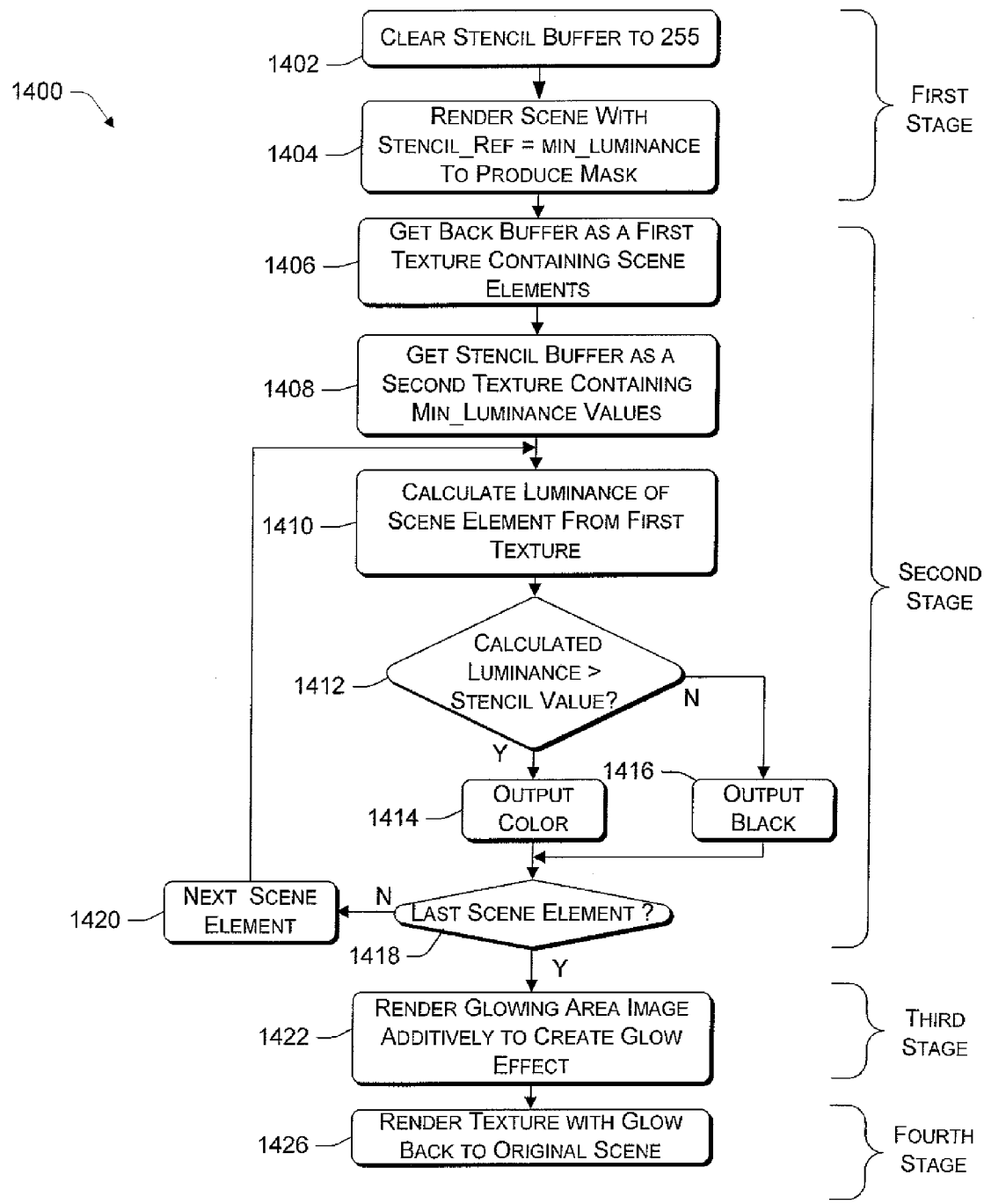
FIG. 14 shows a more detailed description of the process for generating a glow effect according to the first implementation shown in FIG. 11.

FIG. 14 shows a more detailed description of a process 1400 for generating a glow effect according to the first implementation (that is, more detailed than the overview presented in FIG. 11). FIG. 14 should also serve as a summary of the above-identified description of FIGS. 12 and 13.

In the first stage, step 1402 entails clearing the stencil buffer 1008 so that the stencil values stored therein have a value equal to 255. Step 1404 entails rendering the scene to produce a rendered scene image 1228. In this rendering, the STENCIL_REF values are set to respective minimum luminance values (Min_Luminance values) to produce a mask 1222 in the stencil buffer 1008.

In the second stage, step 1406 entails retrieving the contents of the back buffer (that is, the rendered image scene 1228) and providing these contents as a first texture. Step 1408 entails retrieving the contents of the stencil buffer 1008 (the mask) and providing these contents as a second texture. Step 1410 entails calculating the luminance of a scene element (e.g., pixel) under consideration from color values stored in the first texture. Step 1412 entails determining whether the calculated luminance value is greater than the associated stencil value stored in the second texture. If step 1412 is answered in the affirmative, step 1414 is performed, which entails outputting the color value in the first texture (that is, the color of the scene element as registered in the rendered scene image 1228). If step 1412 is answer in the negative, step 1416 entails outputting the color of black (corresponding to R=0, G=0, B=0). Step 1418 determines whether there is another scene element within the input textures to process. If so, step 1420 initiates the above-described procedure with respect to this other scene element. If not, the process 1400 advances to the third stage. Generally, the result of the coloring steps 1414 and 1416 is to construct the selected area image 1216 containing the to-glow area 1238.

In the third stage, step 1422 entails additively rendering the selected area image 1216 to produce the glowing area image 1218. This procedure may correspond to the generation of the multiple offset versions of the selected area image 1216 in the manner discussed in connection with FIG. 13.

In the fourth stage, step 1426 entails adding the glowing area image 1218 back to the original scene to produce a final scene image 1220 including the glow effect.

Figure 15:
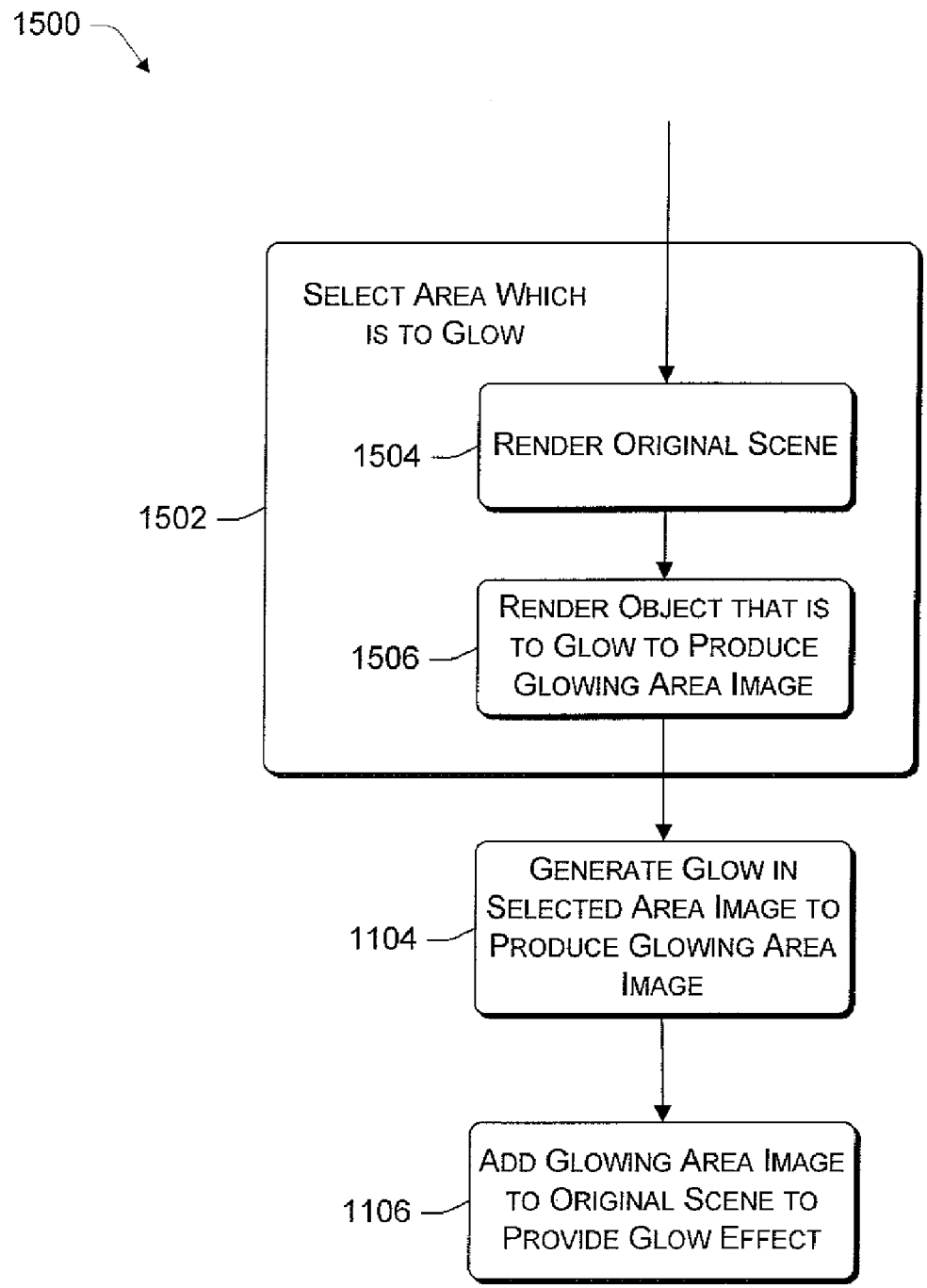
FIG. 15 shows an exemplary overview of a process for generating a glow effect according to a second implementation.

FIG. 15 shows an exemplary overview of a process 1500 for generating a glow effect according to a second implementation. This process 1500 differs from the process 1100 in FIG. 11 by including a different procedure for generating the selected area image 1216. More specifically, step 1102 in FIG. 11 generates the selected area image 1216 by forming a mask 1222 in the stencil buffer 1008, and then applying this mask 1222 to the rendered scene image 1228. In contrast, step 1502 in FIG. 15 generates the selected area image 1216 by first rendering the original scene in step 1504, and then separately rendering the glow-enabled object in step 1506 (or rendering plural glow-enabled objects). In other words, step 1102 in FIG. 11 effectively generates the selected area image 1216 in one pass, because both the rendered scene image 1216 and the mask 1222 can be generated in one pass using the back buffer and the stencil buffer 1008, respectively. In contrast, step 1502 in FIG. 15 generates the selected area image 1216 in two passes, namely, a first pass to render the entire original scene including the glow-enabled object, and a second pass to render just the glow-enabled object. The second pass provides the selected area image 1216. More specifically, certain parts of the glow-enabled object may be occluded by other objects positioned in front of the glow-enabled object. Accordingly, the second pass renders the glow-enabled object in such a manner that these parts are not included in the selected area image 1216. A determination can be made of what parts are occluded by making reference to the depth buffer.

The remainder of the steps in FIG. 15 are identical to the steps in FIG. 11. That is, step 1104 entails generating a glowing area image 1218 by additively rendering the selected area image 1216. Step 1106 entails adding the glowing area image 1218 back to the original scene to generate the glow effect.

Those skilled in the art will appreciate that other variations on the basic procedure shown in FIG. 11 are possible.

Figure 16:
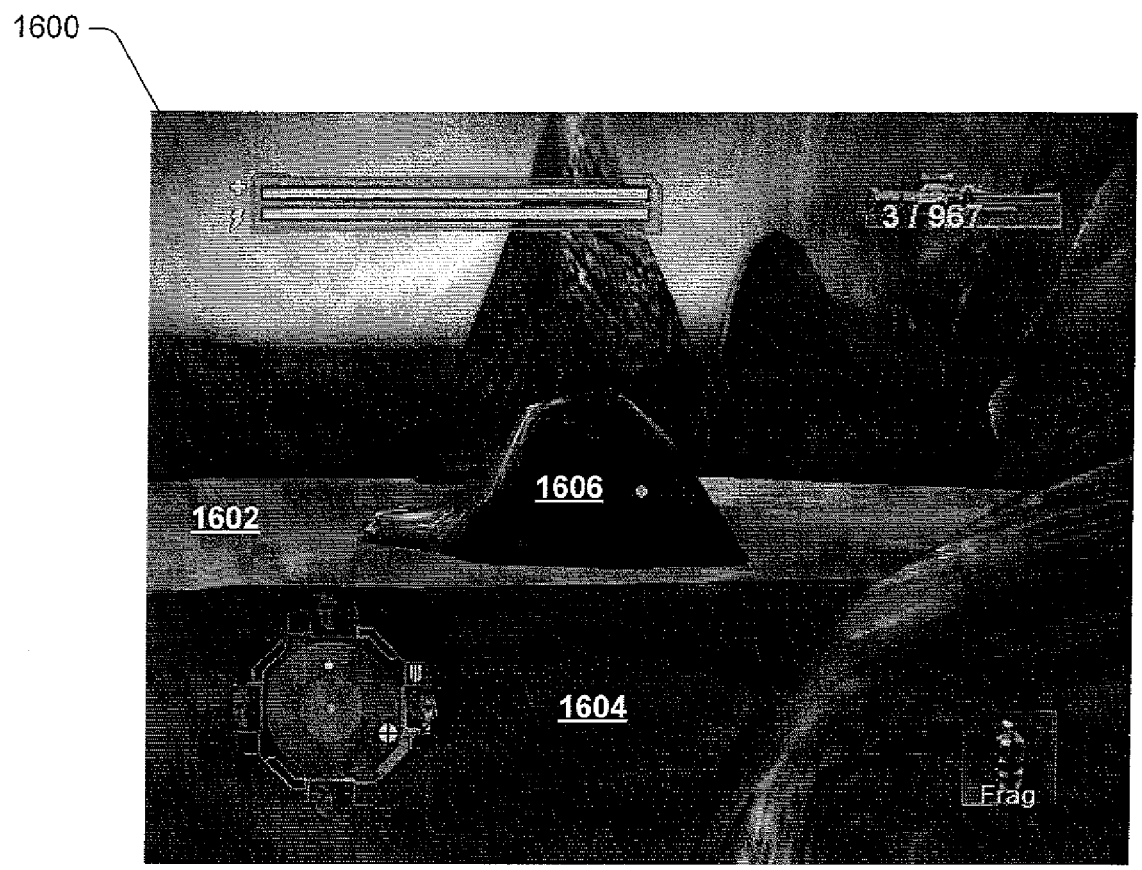
FIG. 16 shows an exemplary first reference scene without the glow effect.
Figure 17:
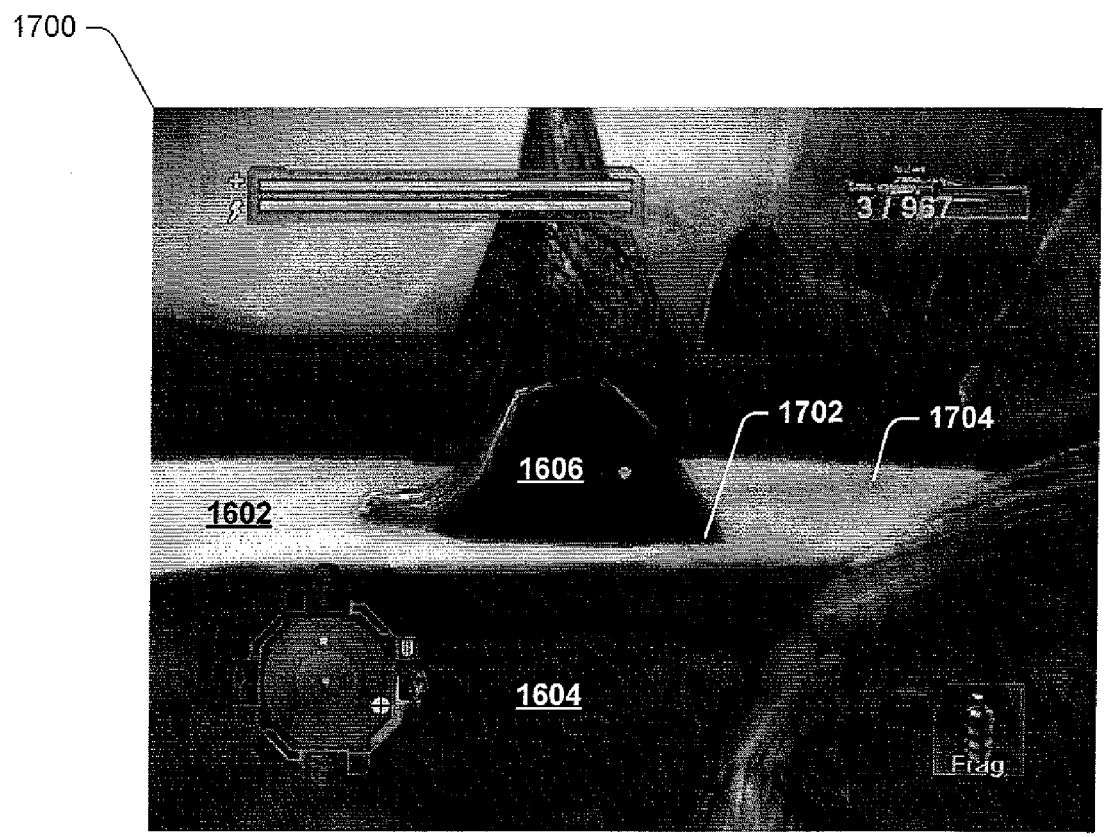
FIG. 17 shows an exemplary scene containing the same scene content as the first reference scene, but which includes the glow effect.

FIGS. 16 and 17 show an example of the glow effect. More specifically, FIG. 16 shows a first reference scene 1600 that does not yet contain the glow effect, and FIG. 17 shows a scene 1700 containing the same scene content as the first reference scene 1600, but that includes the glow effect. In general, these figures illustrate the application of the glow effect within the context of scenes produced by a video game. The particular game illustrated here pertains to a squad-based genre game. In a squad-based game, a game player issues commands to various squad characters. The commands instruct the characters on where to move and how to function in combat. The various overlay information shown in these scenes pertains to this squad-based game, but since this information has no bearing on the glow effect itself, this information will not be further discussed. The video game context shown in FIGS. 16 and 17 is, of course, entirely exemplary.

With reference to FIG. 16, the area within the first reference scene 1600 that is to glow corresponds to the lava field 1602. An exemplary region within the first reference scene 1600 that is not to glow corresponds to foreground terrain 1604. Another area within the first reference scene 1600 that is not to glow corresponds to a rock 1606 that is positioned within the lava field 1602.

FIG. 17 shows the scene 1700 including the glow effect. In this scene 1700, the lava field 1602 now appears to glow. More specifically, the glow is manifested in this exemplary case by the brightening of the lava field 1602. The glow is also manifested in the blurring of the lava field 1602 (due to the additive rendering of the multiple versions of the selected area image 1216 in different respective offset directions). Due to the blurring effect, the glow from the lava field 1602 appears to bleed or leak onto regions that are not glowing, such as foreground terrain 1604 and rock 1606. Sample region 1702 identifies one portion where the bleeding is particularly noticeable. The slightly darkened subarea 1704 might correspond to a region within the lava field 1602 that, despite its inclusion with the area that is to glow, includes luminance values that did not exceed the minimum luminance values specified within the mask 1222. Accordingly, the glow effect has not been applied to this subarea 1704. In other words, this subarea 1704 in FIG. 17 may correspond to the non-glowing subarea 1256 shown in FIG. 12.

Figure 18:
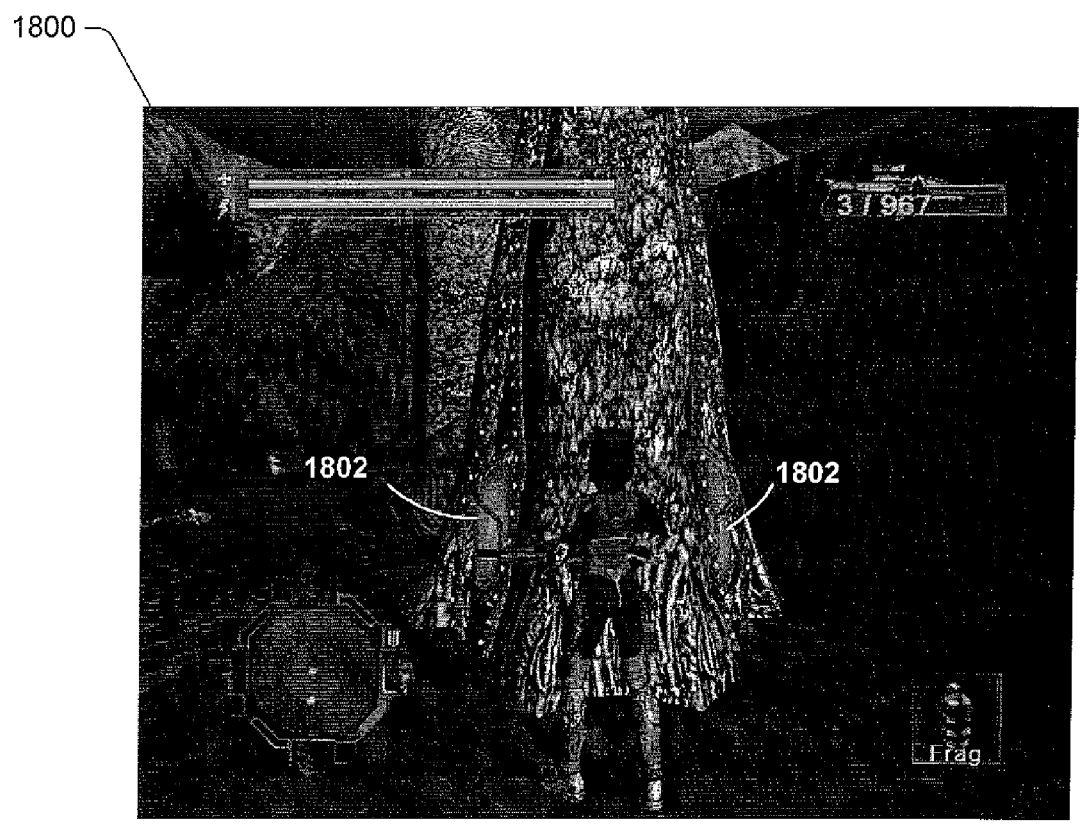
FIG. 18 shows an exemplary second reference scene without the glow effect.
Figure 19:
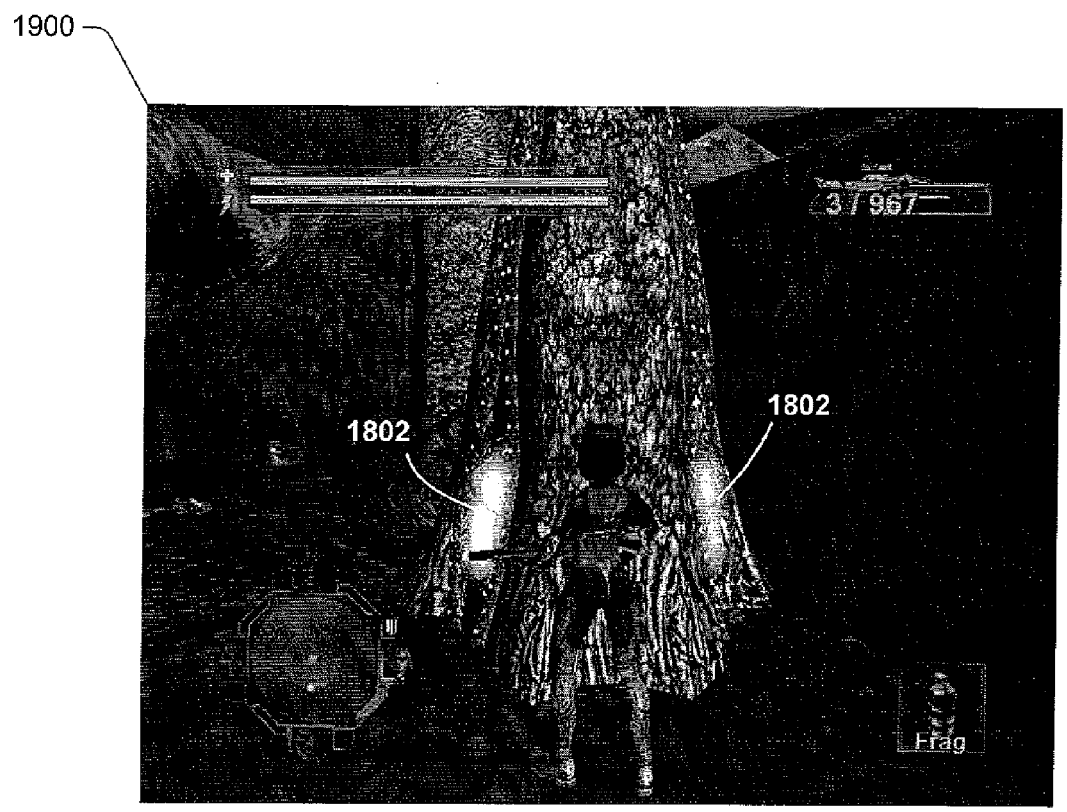
FIG. 19 shows an exemplary scene containing the same scene content as the second reference scene, but which includes the glow effect.

FIGS. 18 and 19 show another example of the glow effect. More specifically, FIG. 18 shows a second reference scene 1800 that does not yet contain the glow effect, and FIG. 19 shows a scene 1900 containing the same scene content as the scene 1800, but that includes the glow effect. With reference to FIG. 18, the area within the scene 1800 that is to glow corresponds to the "crystal window" 1802. FIG. 19 shows the scene 1900 including the glow effect applied to the crystal window 1802. Again, the glow is manifested in this exemplary case by the brightening and blurring of the crystal window 1802.

D. CONCLUSION

The disclosed technique applies a glow effect to an image to simulate a glowing object in the physical realm. The technique includes selecting an area which is to glow to provide a selected area image, generating glow using the selected area by blurring the selected area image to produce a glowing area image, and adding the glowing area image back to the original scene. The technique provides a realistic-looking special effect in a resource-efficient manner.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for generating a glow effect in an image, comprising:
   selecting an area within a rendered scene that is to glow to produce a selected area image based on a determination of luminance of scene elements in the scene;
   generating glow by blurring the selected area image to produce a glowing area image; and
   adding the glowing area image to the scene to provide the glow effect,
   wherein the selecting comprises:
      rendering the scene to provide a rendered scene image;
      creating a mask that defines the area which is to glow; and
      applying the mask to the rendered scene image to produce the selected area image.

2. A method according to claim 1, wherein the creating of the mask comprises:
   creating stencil values within a stencil buffer that define the area which is to glow, wherein the stencil values correspond to respective scene elements within the rendered scene image.

3. A method according to claim 2, wherein the creating of the stencil values comprises:
   setting the stencil values to an initial value before the scene is rendered; and
   modifying selected initial values in the course of the rendering to provide the stencil values that define the area which is to glow.

4. A method according to claim 2, wherein the applying comprises:
   providing luminance values respectively associated with the scene elements within the rendered scene image;
   performing a masking test by comparing the stencil values in the stencil buffer with corresponding luminance values associated with respective scene elements in the rendered scene image;
   outputting a masking color value for scene elements in the rendered scene image that fail the masking test; and
   outputting a non-masking color value for scene elements in the rendered scene image that pass the masking test.

5. A method as recited in claim 4, wherein the masking test determines whether luminance values associated with the respective scene elements in the rendered scene image are larger than corresponding stencil values in the stencil buffer.

6. A method as recited in claim 4, wherein the masking color is black, and the non-masking color is a non-black color.

7. A method as recited in claim 1, wherein the selected area image has a smaller information content size than the rendered area image.

8. A method as recited in claim 1, wherein the generating comprises:
   generating multiple versions of the selected area image; and
   forming a weighted sum of the multiple versions to provide the glowing area image.

9. A method as recited in claim 8, where the multiple versions are offset from a reference center point in different respective directions.

10. A method according to claim 9, wherein the multiple versions include a first collection of versions that are offset from the reference center point by a first prescribed amount in different respective directions, and a second collection of versions that are offset from the reference center point by a second prescribed amount in different respective directions.

11. A method as recited in claim 1, wherein the glowing area image has a smaller information content size than the selected area image.

12. A method as recited in claim 1, wherein the selecting comprises rendering the scene to provided a rendered scene image, and wherein the adding comprises adding color values within the glowing area image to associated color values within the rendered scene image.

13. A method according to claim 1, wherein the selecting comprises:

rendering the scene to provided a rendered scene image; and separately rendering the area which is to glow to produce the selected area image.

14. A method according to claim 1, wherein the selecting comprises selecting an element of the selected area image if the element has a luminance which exceeds a prescribed threshold luminance.

15. A computer-readable medium having computer-executable instructions for performing the method recited in claim 1.

16. An apparatus for generating a glow effect in an image, comprising:

area formation logic configured to select an area within a rendered scene that is to glow to produce a selected area image based on a determination of luminance of scene elements in the scene, wherein selection by the selection logic comprises: rendering the scene to provide a rendered scene image, creating a mask that defines the area which is to glow, and applying the mask to the rendered scene image to produce the selected area image;

glow generation logic configured to generate glow using the selected area image to produce a glowing area image; and glow application logic configured to add the glowing area image to the scene to provide the glow effect.

17. The apparatus of claim 16, wherein the area formation logic is configured to select an element of the selected area image if the element has a luminance which exceeds a prescribed threshold luminance.

* * * * *